(12) United States Patent
Yamauchi et al.

(10) Patent No.: US 11,205,774 B2
(45) Date of Patent: Dec. 21, 2021

(54) NICKEL COMPOSITE HYDROXIDE AND PROCESS FOR PRODUCING SAME, POSITIVE ELECTRODE ACTIVE MATERIAL AND PROCESS FOR PRODUCING SAME, AND NON-AQUEOUS ELECTROLYTE SECONDARY BATTERY

(71) Applicant: SUMITOMO METAL MINING CO., LTD., Tokyo (JP)

(72) Inventors: Mitsuru Yamauchi, Ehime (JP); Kazuomi Ryoshi, Ehime (JP); Kensaku Mori, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 105 days.

(21) Appl. No.: 16/739,355

(22) Filed: Jan. 10, 2020

(65) Prior Publication Data
US 2020/0152972 A1 May 14, 2020

Related U.S. Application Data

(62) Division of application No. 15/322,406, filed as application No. PCT/JP2015/062534 on Apr. 24, 2015.

(30) Foreign Application Priority Data

Jun. 27, 2014 (JP) ................. 2014-133402

(51) Int. Cl.
*H01M 4/00* (2006.01)
*H01M 4/36* (2006.01)
(Continued)

(52) U.S. Cl.
CPC ............ *H01M 4/364* (2013.01); *C01G 53/00* (2013.01); *C01G 53/50* (2013.01); *H01M 4/04* (2013.01);
(Continued)

(58) Field of Classification Search
CPC ............ C01P 2004/03; C01P 2006/12; C01G 53/00; Y02E 60/10; H01M 4/04
See application file for complete search history.

(56) References Cited

U.S. PATENT DOCUMENTS 6,241,959 B1    6/2001    Cho et al.
6,306,787 B1    10/2001    Sato et al.
(Continued)

FOREIGN PATENT DOCUMENTS

JP    H11-1324 A    1/1999
JP    H11-60246 A    3/1999
(Continued)

OTHER PUBLICATIONS

Jun. 16, 2015 Search Report issued in International Patent Application No. PCT/JP2015/062534.
(Continued)

*Primary Examiner* — Cynthia H Kelly
*Assistant Examiner* — Monique M Wills
(74) *Attorney, Agent, or Firm* — Oliff PLC

(57) ABSTRACT

A positive electrode active material for a non-aqueous electrolyte secondary battery achieves high output characteristics and battery capacity, and allows a high electrode density to be achieved in the case of using the material for a positive electrode of a battery; and a non-aqueous electrolyte secondary battery uses the positive electrode active material, thereby achieving a high output with a high capacity. Prepared is a nickel composite hydroxide including plate-shaped secondary particles aggregated with overlaps between plate surfaces of multiple plate-shaped primary particles, where shapes projected from directions perpendicular to the plate surfaces of the plate-shaped primary particles are any plane projection shape of spherical, elliptical, oblong, and massive shapes, and the secondary par-
(Continued)

ticles have an aspect ratio of 3 to 20, and a volume average particle size (Mv) of 4 μm to 20 μm measured by a laser diffraction scattering method.

13 Claims, 5 Drawing Sheets

(51) Int. Cl.
*H01M 4/505* (2010.01)
*H01M 4/525* (2010.01)
*C01G 53/00* (2006.01)
*H01M 4/04* (2006.01)
*H01M 10/052* (2010.01)
*H01M 4/131* (2010.01)
*H01M 4/02* (2006.01)

(52) U.S. Cl.
CPC ........... *H01M 4/505* (2013.01); *H01M 4/525* (2013.01); *H01M 10/052* (2013.01); *C01P 2002/50* (2013.01); *C01P 2004/03* (2013.01); *C01P 2004/20* (2013.01); *C01P 2004/45* (2013.01); *C01P 2004/51* (2013.01); *C01P 2004/54* (2013.01); *C01P 2004/61* (2013.01); *C01P 2006/12* (2013.01); *C01P 2006/40* (2013.01); *H01M 4/131* (2013.01); *H01M 2004/028* (2013.01); *Y02T 10/70* (2013.01)

(56) References Cited

U.S. PATENT DOCUMENTS

| | | |
|---|---|---|
| 2001/0028874 A1 | 10/2001 | Cho et al. |
| 2012/0276454 A1 | 11/2012 | Mori et al. |
| 2013/0108926 A1 | 5/2013 | Kim et al. |
| 2014/0011090 A1* | 1/2014 | Toya .................... C01G 53/006 429/223 |
| 2014/0186710 A1 | 7/2014 | Ryoshi et al. |
| 2016/0043396 A1 | 2/2016 | Sakai et al. |
| 2018/0323431 A1 | 11/2018 | Kase et al. |

FOREIGN PATENT DOCUMENTS

| | | |
|---|---|---|
| JP | H11-246225 A | 9/1999 |
| JP | 2003-178756 A | 6/2003 |
| JP | 2012-084502 A | 4/2012 |
| JP | 2014-129188 A | 7/2014 |
| WO | 2012/169274 A1 | 12/2012 |
| WO | 2014/061399 A1 | 4/2014 |

OTHER PUBLICATIONS

Yamauchi, Mitsuru et al., "Li (Ni, Mn, Co)O2 no Keitai Seigyo niyoru Kessho Kozo Denchi Tokusei eno Eikyo", The Ceramic Society of Japan 2014 nen Nenkai Koen Yokoshu, Mar. 7, 2014, p. 3I12.

* cited by examiner

NICKEL COMPOSITE HYDROXIDE AND PROCESS FOR PRODUCING SAME, POSITIVE ELECTRODE ACTIVE MATERIAL AND PROCESS FOR PRODUCING SAME, AND NON-AQUEOUS ELECTROLYTE SECONDARY BATTERY

This application is a Divisional of application Ser. No. 15/322,406, filed Dec. 27, 2016, which in turn is a National Stage of International Application No. PCT/JP2015/062534, filed on Apr. 24, 2015, which claims priority to Japanese Application No. 2014-133402, filed on Jun. 27, 2014. The disclosures of the prior applications are hereby incorporated by reference herein in their entirety.

BACKGROUND OF THE INVENTION

Field of the Invention

The present invention relates to a nickel composite hydroxide and a production process therefor, a positive electrode active material and a production process therefor, and a non-aqueous electrolyte secondary battery. More particularly, the invention relates to a nickel composite hydroxide for a precursor for a lithium-nickel composite oxide which is used as a positive electrode active material in a non-aqueous electrolyte secondary battery such as a lithium ion secondary battery, and a production process therefor, a positive electrode active material and a production process using a nickel composite hydroxide for a precursor, and a non-aqueous electrolyte secondary battery that uses the positive electrode active material. It is to be noted that the present application claims priority based on the Japanese Patent Application No. 2014-133402 filed on Jun. 27, 2014 in Japan.

Description of Related Art

In recent years, along with the popularization of mobile devices such as cellular phones and lap-top personal computers, the development of small and light secondary batteries with a high energy density has been desired strongly. Such secondary batteries include, for example, lithium ion secondary batteries that use lithium, lithium alloys, metal oxides, carbon, and the like as negative electrodes, which have been actively researched and developed.

Lithium ion secondary batteries that use lithium metal composite oxides, in particular, lithium-cobalt composite oxides for positive electrode active materials achieve high voltages on the order of 4 V, which have been thus expected as batteries with a high energy density, and progressively put into practical use. Large numbers of batteries that use lithium-cobalt composite oxides have been ever developed in order to achieve excellent initial capacity characteristics and cycle characteristics, and various results have been already achieved.

Positive electrode active materials which have been ever mainly proposed can include lithium-cobalt composite oxides ($LiCoO_2$) which are relatively easily synthesized, lithium-nickel composite oxides ($LiNiO_2$) and lithium-nickel-cobalt-manganese composite oxides ($LiNi_{1/3}Co_{1/3}Mn_{1/3}O_2$) which use more inexpensive nickel than cobalt, and lithium-manganese composite oxides ($LiMn_2O_4$) which use manganese, and spherical or substantially spherical particles easily synthesized are used mainly.

Main characteristics of batteries that use the positive electrode active materials include a capacity and a power density, and a high power density is required for, in particular, hybrid in-car batteries for which there has been increasing demand in recent years.

Methods for improving the power density of a battery include the reduction in the thickness of electrode films for use in secondary batteries, and for example, in hybrid in-car batteries, films on the order of 50 µm in thickness are used. The reason that the thickness of electrode films can be reduced in hybrid in-car batteries is because the movement distance of lithium ions is reduced. As just described, there is a possibility that the positive electrode active materials for use in thin electrode films will break through the electrode films, the positive electrode active materials are thus limited to small-size particles that are uniform in particle size, and in the case of electrode films for hybrid in-car batteries, particles on the order of 5 µm are used.

However, when such small-size particles are used for electrode films, the volume energy density which is an important characteristic along with the power density is disadvantageously decreased because of the low electrode densities.

Patent Document 1: JP 2012-84502 A

SUMMARY OF THE INVENTION

Methods for breaking through the trade-off relation include changing the shapes of commonly spherical or substantially spherical positive electrode active material particles, specifically into plate shapes. The plate shapes of the positive electrode active material particles have a surface area increased as compared with spherical particles in the same volume, and when the plate-shaped particles are oriented in electrode preparation, a high electrode density can be achieved. Furthermore, these oriented particles which are high in aspect ratio allow the thickness of the electrode to be further reduced, and allow the output to be further improved.

For example, Patent Literature 1 discloses, as such plate-shaped positive electrode active material particles, plate-shaped particles for positive electrode active materials, where primary crystal particles (particles oriented at lithium accessible surfaces) oriented such that the (003) plane intersects plate surfaces of the plate-shaped particles, with $t \leq 30$ and $d/t \geq 2$ when the thickness (µm), the particle size as a dimension in a direction perpendicular to a thickness direction that defines the thickness t, and the aspect ratio are denoted respectively by t, d, and d/t, are dispersed in an assembly of primary crystal particles (a large number of (003)-plane oriented particles) oriented such that the (003) plane is parallel to the plate surfaces of the plate-shaped particles.

However, even when the lithium accessible surfaces are oriented outside secondary particles as described in Patent Literature 1, output characteristics will be adversely affected when the positive electrode active material is insufficiently brought into contact with an electrolyte. In addition, Patent Literature 1 discloses rate characteristics, but fails to disclose any battery capacity itself which is an important characteristic among battery characteristics.

As described above, it is difficult in the prior art to industrially acquire positive electrode active materials which can form thin electrode films with a high electrode density, and have a high capacity and excellent output characteristics.

An object of the present invention is, in view of the foregoing problems, to provide a positive electrode active material for a non-aqueous electrolyte secondary battery which can form a thin electrode film, achieves high output characteristics and battery capacity, and allows a high electrode density to be achieved in the case of using the material for a positive electrode of a battery; and a non-aqueous electrolyte secondary battery that uses the positive electrode active material, thereby achieving a high output with a high capacity.

In addition, an object of the present invention is to provide a nickel composite hydroxide as a precursor for a positive electrode active material, which makes it possible to provide a positive electrode active material for such a non-aqueous electrolyte secondary battery.

Therefore, the inventors have earnestly carried out studies on positive electrode active materials for non-aqueous electrolyte secondary batteries, which have shapes capable of achieving a high electrode density, and nickel composite hydroxides as precursors for the positive electrode active materials. As a result, the inventors have found that the control of the compositions of the nickel composite hydroxides during crystallization and the crystallization conditions achieves plate-shaped secondary particles aggregated with overlaps between plate surfaces of multiple plate-shaped primary particles.

Furthermore, the inventors have found that the foregoing nickel composite hydroxide is mixed with a lithium compound, and subjected to calcination, thereby providing a positive electrode active material which takes over the shape of the nickel composite hydroxide, thereby making it possible to achieve a balance between high output characteristics and battery capacity and a high electrode density, and thus achieved the present invention.

More specifically, a nickel composite hydroxide according to the present invention for achieving the object is a nickel composite hydroxide represented by $Ni_{1-x-y-z}Co_xMn_yM_z(OH)_{2+A}$ (x, y, z, and A in the formula fall within ranges of: $0<x\leq0.35$; $0\leq y\leq0.35$; $0\leq z\leq0.1$; and $0\leq A\leq0.5$, x, y, and z meet $0<x+y+z\leq0.7$, and M in the formula represents at least one additive element selected from V, Mg, Al, Ti, Mo, Nb, Zr, and W), the nickel composite hydroxide characteristically including plate-shaped secondary particles aggregated with overlaps between plate surfaces of multiple plate-shaped primary particles, where shapes projected from directions perpendicular to the plate surfaces of the plate-shaped primary particles are any plane projection shape of spherical, elliptical, oblong, and massive shapes, and the secondary particles have an aspect ratio of 3 to 20, and a volume average particle size (Mv) of 4 µm to 20 µm measured by a laser diffraction scattering method.

The nickel composite hydroxide is preferably 0.70 or less in [(D90−D10)/Mv] indicating a particle size variation index, which is calculated from D90 and D10 in a particle size distribution obtained by a laser diffraction scattering method and the volume average particle size (Mv).

In addition, in the nickel composite hydroxide, the average value is preferably 1 µm to 5 µm for the maximum diameters of the plate-shaped primary particles projected from directions perpendicular to plate surfaces of the secondary particles.

Furthermore, the nickel composite hydroxide preferably has at least a concentration layer of cobalt, and the concentration layer is preferably 0.01 µm to 1 µm in thickness.

A process for producing a nickel composite hydroxide according to the present invention is a production process for producing a nickel composite hydroxide represented by $Ni_{1-x-y-z}Co_xMn_yM_z(OH)_{2+A}$ (x, y, z, and A in the formula fall within ranges of: $0<x\leq0.35$; $0\leq y\leq0.35$; $0\leq z\leq0.1$; and $0\leq A\leq0.5$, x, y, and z meet $0<x+y+z\leq0.7$, and M in the formula represents at least one additive element selected from V, Mg, Al, Ti, Mo, Nb, Zr, and W), the process characteristically including: a nucleation step of generating plate-shaped crystal nuclei by adjusting an aqueous solution for nucleation, including a metal compound containing cobalt, where the content of cobalt is 90 atom % or more with respect to all metal elements, to an pH value of 12.5 or more on the basis of a liquid temperature of 25° C. in a non-oxidizing atmosphere with an oxygen concentration of 5 volume % or less; and a particle growth step of causing growth of the plate-shaped crystal nuclei until the aspect ratio falls within the range of 3 to 20, by adjusting slurry for particle growth, containing the plate-shaped crystal nuclei formed in the nucleation step, in a non-oxidizing atmosphere with an oxygen concentration of 5 volume % or less, such that the pH value of the slurry is 10.5 to 12.5 on the basis of a liquid temperature of 25° C., and lower than the pH value in the nucleation step, and supplying a mixed aqueous solution including a metal compound containing at least nickel to the slurry for particle growth.

In the process for producing a nickel composite hydroxide, nucleation is preferably developed in a non-oxidizing atmosphere with an oxygen concentration of 2 volume % or less in the nucleation step, and the ammonia concentration of the slurry for particle growth is preferably adjusted to 5 g/L to 20 g/L in the particle growth step.

In addition, in the process for producing a nickel composite hydroxide, plate-shaped crystal nucleus-containing slurry with a pH value adjusted is used as the slurry for particle growth, the plate-shaped crystal nucleus-containing slurry containing the plate-shaped crystal nuclei obtained in the nucleation step.

A positive electrode active material for a non-aqueous electrolyte secondary battery according to the present invention is a positive electrode active material for a non-aqueous electrolyte secondary battery, the positive electrode active material including a lithium-nickel composite oxide represented by $Li_{1+u}Ni_{1-x-y-z}Co_xMn_yM_zO_2$ (u, x, y, and z in the formula fall within ranges of: $-0.05\leq u\leq0.50$; $0<x\leq0.35$; $0<y\leq0.35$; and $0\leq z\leq0.1$, x, y, and z meet $0<x+y+z\leq0.7$, and M in the formula represents at least one additive element selected from V, Mg, Al, Ti, Mo, Nb, Zr, and W), the lithium-nickel composite oxide having a hexagonal layered structure, characteristically where lithium-nickel composite oxide includes plate-shaped secondary particles aggregated with overlaps between plate surfaces of multiple plate-shaped primary particles, shapes projected from directions perpendicular to the plate surfaces of the plate-shaped primary particles are any plane projection shape of spherical, elliptical, oblong, and massive shapes, and the secondary particles have an aspect ratio of 3 to 20, and a volume average particle size (Mv) of 4 µm to 20 µm measured by a laser diffraction scattering method.

In the positive electrode active material for a non-aqueous electrolyte secondary battery, the specific surface area is preferably 0.3 $m^2$/g to 2 $m^2$/g, and the [(D90−D10)/Mv] indicating a particle size variation index is preferably 0.75 or less, which is calculated from D90 and D10 in a particle size distribution obtained by a laser diffraction scattering method and the volume average particle size (Mv).

In addition, in the positive electrode active material for a non-aqueous electrolyte secondary battery, the site occupancy is preferably 7% or less at 3a sites with metal ions other than lithium, and the site occupancy is preferably 7% or less at 3b sites with lithium ions, the site occupancies obtained from Rietveld analysis with X-ray diffraction analysis, and the orientation index at a (003) plane is preferably 0.9 to 1.1, which is found by X-ray diffraction analysis.

A process for producing a positive electrode active material for a non-aqueous electrolyte secondary battery according to the present invention is a process for producing a positive electrode active material for a non-aqueous electrolyte secondary battery, the positive electrode active material including a lithium-nickel composite oxide represented by $Li_{1+u}Ni_{1-x-y-z}Co_xMn_yM_zO_2$ (u, x, y, and z in the formula fall within ranges of: $-0.05 \le u \le 0.50$; $0 < x \le 0.35$; $0 \le y \le 0.35$; and $0 \le z \le 0.1$, x, y, and z meet $0 < x+y+z \le 0.7$, and M in the formula represents at least one additive element selected from V, Mg, Al, Ti, Mo, Nb, Zr, and W), the lithium-nickel composite oxide having a hexagonal layered structure, the process characteristically including: a mixing step of forming a lithium mixture by mixing the nickel composite hydroxide with a lithium compound; and a calcining step of calcining the lithium mixture formed in the mixing step at a temperature of 650° C. to 980° C. in an oxidizing atmosphere.

In the process for producing a positive electrode active material for a non-aqueous electrolyte secondary battery, the ratio (Li/Me) of the lithium atom number (Li) to the sum (Me) of the atom numbers of metals other than lithium included in the lithium mixture is preferably 0.95 to 1.5.

In addition, the process for producing a positive electrode active material for a non-aqueous electrolyte secondary battery preferably further includes, before the mixing step, a heat treatment step of applying a heat treatment to the nickel composite hydroxide at a temperature of 300° C. to 750° C. in a non-reducing atmosphere.

Furthermore, in the process for producing a positive electrode active material for a non-aqueous electrolyte secondary battery, the oxidizing atmosphere in the calcining step is preferably an atmosphere containing 18 volume % to 100 volume % of oxygen.

A non-aqueous electrolyte secondary battery according to the present invention has a positive electrode, a negative electrode, a non-aqueous electrolyte, and a separator, and the positive electrode is characteristically formed from the above-mentioned positive electrode active material for a non-aqueous electrolyte secondary battery.

According to the present invention, the nickel composite hydroxide can be obtained which is preferred as a precursor for a positive electrode active material for a non-aqueous electrolyte secondary battery.

According to the present invention, when the nickel composite hydroxide is used as a precursor for a positive electrode active material of a non-aqueous electrolyte secondary battery, a positive electrode active material can be obtained which provides high output characteristics and battery capacity, and allows a high electrode density to be achieved.

According to the present invention, when the positive electrode active material is applied to a non-aqueous electrolyte secondary battery, a thin electrode film can be formed, and a non-aqueous electrolyte secondary battery can be achieved which has high output characteristics and battery capacity while achieving a balance therebetween.

DETAILED DESCRIPTION OF THE INVENTION

Figure 1:
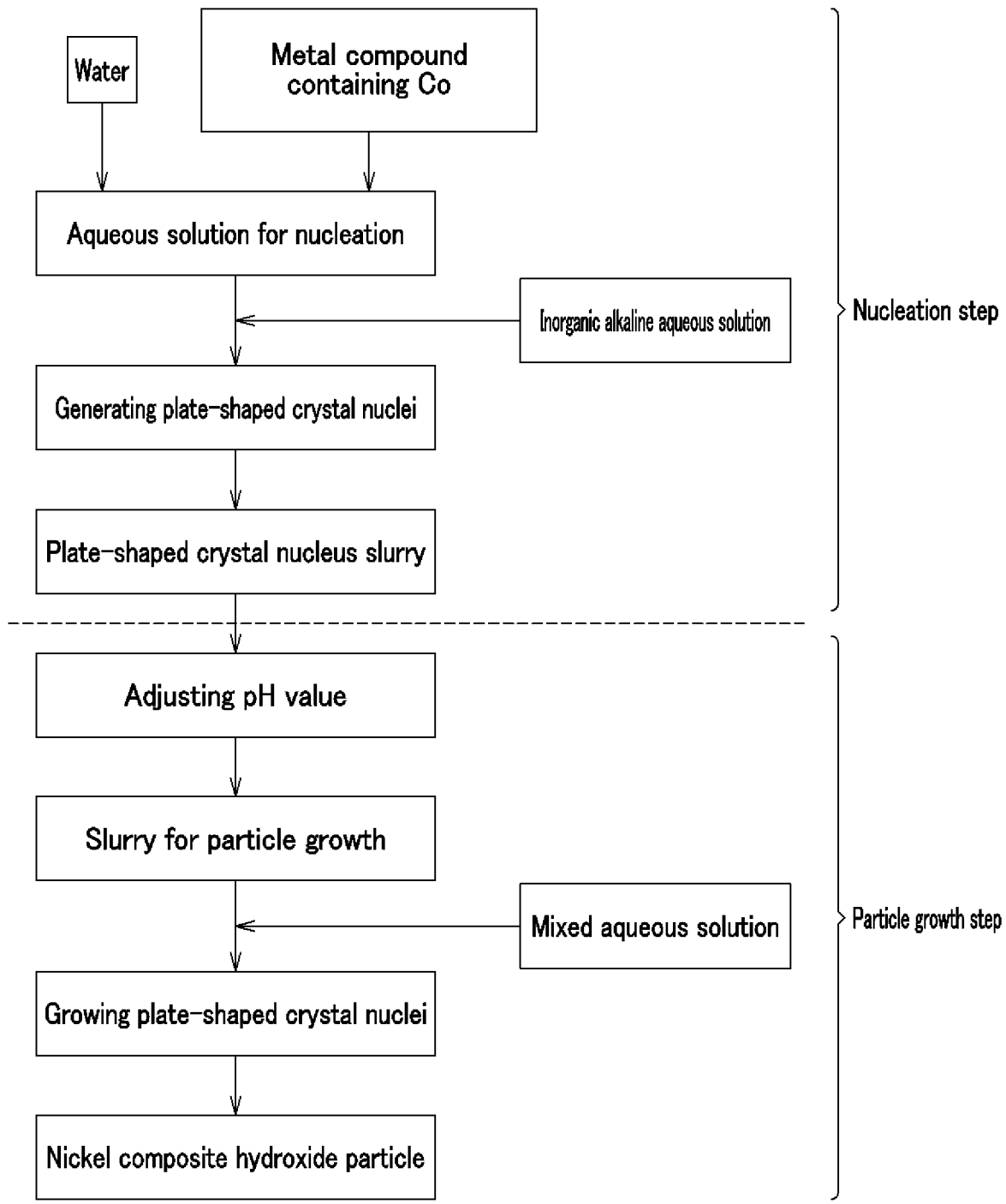
FIG. 1 is a flowchart showing a process for producing a nickel composite hydroxide in accordance with the present invention applied.

Specific embodiments (hereinafter, referred to as "the present embodiments") in accordance with the present invention applied will be described in detail with reference to the drawings with respect to the following items. It is to be noted that the present invention is not to be considered limited to the following embodiments, but various modifications can be made without departing from the scope of the present invention.

[1] Nickel Composite Hydroxide and Production Process therefor

[2] Positive Electrode Active Material for Non-Aqueous Electrolyte Secondary Battery and Production Process therefor

[3] Non-aqueous Electrolyte Secondary Battery

[1] Nickel Composite Hydroxide and Production Process Therefor

<1-1> Nickel Composite Hydroxide

The nickel composite hydroxide according to the present embodiment includes plate-shaped secondary particles aggregated with overlaps between plate surfaces of multiple plate-shaped primary particles, where shapes projected from directions perpendicular to the plate surfaces of the plate-shaped primary particles are any plane projection shape of spherical, elliptical, oblong, and massive shapes, and the secondary particles have an aspect ratio of 3 to 20, and a volume average particle size (Mv) of 4 μm to 20 μm measured by a laser diffraction scattering method.

The inventors have found, as a result of studying the filling density of a positive electrode active material in a positive electrode and the area of contact with an electrolytic solution, that the use of a positive electrode active material composed of plate-shaped secondary particles aggregated with overlaps between plate surfaces of plate-shaped primary particles makes it possible to achieve a balance between an improved filling density and an increased area of contact with an electrolytic solution. More specifically, the inventors have found that the use of plate-shaped secondary particles aggregated with overlaps between the plate surfaces of the plate-shaped primary particles where shapes projected from directions perpendicular to the plate surfaces are any plane projection shape of circular, elliptical, oblong, and massive shapes achieves, at the same time, the effects of: ingress of a sufficient amount of electrolytic solution into the secondary particles; an increased area of contact with the electrolytic solution; and further, an improved density of filling with the plate-shaped particles.

(Particle Shape and Structure)

The nickel composite hydroxide is composed of plate-shaped secondary particles aggregated with overlaps between plate surfaces of multiple plate-shaped primary particles, and furthermore, the shapes projected from directions perpendicular to plate surfaces of the plate-shaped primary particles are any plane projection shape of circular, elliptical, oblong, and massive shapes. In this regard, the plate surface means a surface perpendicular to a projection direction corresponding to the maximum projected area of the particle. In addition, the overlaps between the plate surfaces may be tilted from directions corresponding to the plate surfaces parallel to each other, to such an extent that the plate-shaped primary particles are easily aggregated with each other.

The shape of a positive electrode active material particle is supposed to take over the shape of a nickel composite hydroxide particle as a precursor of the positive electrode active material particle (hereinafter, also referred to as a "precursor particle"). Therefore, controlling the shapes of the precursor particles in accordance with plate-shaped secondary particles aggregated with overlaps between plate surfaces of plate-shaped primary particles can also turn the shapes of obtained positive electrode active material particles into similarly characteristic shapes. It is to be noted that in the case of using small-size or plate-shaped precursor particles as used conventionally, positive electrode active material particles are obtained which take over the shapes of the conventional precursor particles, thereby failing to obtain positive electrode active materials as will be described later.

In addition, the secondary particles have an aspect ratio of 3 to 20, preferably 5 to 20, and the nickel composite hydroxide has a volume average particle size (Mv) of 4 μm to 20 μm measured by a laser diffraction scattering method. Furthermore, in the nickel composite hydroxide, the average value (R1) is preferably 1 μm to 5 μm for the maximum diameters of shapes projected from directions perpendicular to plate surfaces of plate-shaped primary particles (the maximum diameters of plate-shaped primary particles projected from directions perpendicular to plate surfaces of secondary particles). When the aspect ratio and Mv that identify the shape of the nickel composite hydroxide (hereinafter, also referred to as "shape-specifying values") go beyond the respective ranges, the shape-specifying values of a positive electrode active material obtained can also depart from respective ranges, thus failing to achieve the effect of achieving high output characteristics and battery capacity, thereby making it possible to achieve a high electrode density as will be described later. Accordingly, there is need for the shape-specifying values (aspect ratio, Mv) to fall within the respective ranges in the nickel composite hydroxide. In addition, R1 is preferably adapted to fall within the range mentioned above, in order to achieve higher output characteristics and battery capacity.

In this regard, the aspect ratio means the ratio (R2/t) of the average value (R2) for the maximum diameters of the secondary batteries, projected from directions perpendicular to the plate surfaces of the secondary particles, to the average value (t) for the maximum thicknesses in directions perpendicular to the plate surfaces. The average value (t) for the maximum thicknesses is obtained by measuring and averaging any twenty or more secondary particles observable from directions parallel to the plate surfaces in appearance observation with a scanning electron microscope. In addition, the average value (R2) for the maximum diameters is obtained by measuring and averaging from observation of any twenty or more secondary particles observable from directions perpendicular to the plate surfaces in appearance observation with a scanning electron microscope. The R2/t is obtained from the respectively obtained maximum thickness (t) and average value (R2) for the maximum diameters, and regarded as the aspect ratio for the secondary particles. In addition, the average value (R1) for the maximum diameters of the plate-shaped primary particles is obtained by measuring and averaging, in the same way as R2, any fifty or more primary particles observable entirely from directions perpendicular to the plate surfaces.

The nickel composite hydroxide is composed of plate-shaped secondary particles aggregated with overlaps between plate surfaces of multiple plate-shaped primary particles, and the secondary particles thus have sufficient voids produced therein. In particular, the shapes projected from directions perpendicular to the plate surfaces of the plate-shaped primary particles are any plane projection shape of circular, elliptical, oblong, and massive shapes, and surfaces parallel to the plate surfaces are thus also configured to have sufficient voids therein. Thus, in the preparation of a positive electrode active material, when the nickel composite hydroxide and a lithium compound are mixed and calcined, the melted lithium compound is distributed into the secondary particles, and lithium is diffused sufficiently, thereby making it possible to obtain a positive electrode active material with favorable crystallinity. On the other hand, plate-shaped secondary particles formed as polycrystalline bodies from primary particles are not configured to have sufficient voids between the primary particles, and the melted lithium compound is distributed insufficiently into the secondary particles. The voids in the secondary particles in the nickel composite hydroxide are left even after a positive electrode active material is obtained, thus making it possible to distribute an electrolyte into the secondary particles in the positive electrode active material.

Furthermore, in the case in accordance with a process for producing a nickel composite hydroxide as will be described later, the nickel composite hydroxide has a concentration layer of cobalt within the primary particles. The secondary particles are formed by causing growth of plate-shaped crystal nuclei produced from a metal compound containing cobalt. Accordingly, a high-concentration layer of cobalt based on the plate-shaped crystal nuclei comes to be present within the primary particles of the nickel composite hydroxide formed. When the plate-shaped crystal nuclei are developed to such an extent that the high concentration layer is formed, the primary particles are developed into desired shapes, and furthermore, the plate-shaped secondary particles are formed by aggregation with overlaps between the plate surfaces of the primary particles. On the other hand, in the absence of a high-concentration layer, the plate-shaped crystal nuclei can be considered non-fully developed, and secondary particles obtained may fail to have a desired shape. However, plate-shaped particles that have such strength to an extent that the particles are not broken during particle growth, and have shapes equivalent to the plate-shaped crystal nuclei mentioned above can be used as plate-shaped crystal nuclei to develop primary particles, and then form secondary particles, and thus, when plate-shaped particles of desired compositions in desired shapes are prepared separately to obtain nickel composite hydroxides, some of the hydroxides are obtained without the high concentration layer mentioned above.

In order to develop the primary particles, and make the shapes of the secondary particles adequate, the high-concentration layer is preferably 0.01 μm to 1 μm in thickness.

The thickness of less than 0.01 μm may break down the plate-shaped crystal nuclei during nucleation or during particle growth, thereby resulting in inadequate development of primary particles. On the other hand, the thickness in excess of 1 μm may make the composition of an obtained positive electrode active material heterogeneous in particles, or fail to develop primary particles into plate shapes.

The crystal growth from the plate-shaped crystal nuclei is developed at both sides of the plate-shaped crystal nuclei, thereby making is possible to develop primary particles into plate shapes with high aspect ratios, and the primary particles preferably have the nuclei in central parts in the thickness direction.

(Composition)

The nickel composite hydroxide has a composition represented by the general formula (1): $Ni_{1-x-y-z}Co_xMn_yM_z(OH)_{2+A}$ (in the formula, x, y, z, and A fall within the ranges of: $0<x\leq0.35$; $0\leq y\leq0.35$; $0\leq z\leq0.1$; and $0\leq A\leq0.5$, x, y, and z meet $0<x+y+z\leq0.7$, and M in the formula represents at least one additive element selected from V, Mg, Al, Ti, Mo, Nb, Zr, and W).

The nickel composite hydroxide contains at least cobalt as described above. x in the general formula (1), which represents the cobalt content, meets $0<x\leq0.35$, and preferably meets $0.05\leq x\leq0.35$, more preferably $0.1\leq x\leq0.35$ in order to develop the plate-shaped crystal nuclei sufficiently.

When a positive electrode active material is obtained with the above-mentioned nickel composite hydroxide as a raw material, the composition ratio (Ni:Co:Mn:M) of the composite hydroxide is maintained in the positive electrode active material obtained. Therefore, the composition ratio of nickel composite hydroxide particles is adapted to be equal to the composition ratio required for a positive electrode active material to be obtained. The composition indicated in the general formula (1) allows, when the obtained positive electrode active material for a non-aqueous electrolyte secondary battery is used for a battery, the battery to provide superior performance.

(Particle Size Distribution)

The nickel composite hydroxide is preferably 0.70 or less in [(D90−D10)/Mv] indicating a particle size variation index, which is calculated from D90 and D10 in a particle size distribution obtained by a laser diffraction scattering method and the volume average particle size (Mv).

The particle size distribution of the positive electrode active material is strongly affected by the nickel composite hydroxide as a precursor, and thus, when the nickel composite hydroxide has fine particles or coarse particles mixed therein, similar particles will also come to be present in the positive electrode active material. More specifically, when the nickel composite hydroxide has a variation index in excess of 0.70 in a wide particle size distribution, the positive electrode active material may also have fine particles or coarse particles.

Accordingly, the adjustment of the variation index of the nickel composite hydroxide to 0.70 or less can reduce the variation index of the positive electrode active material obtained, and thus improve cycle characteristics and output characteristics. While the reduced variation index can improve properties of the positive electrode active material, it is difficult to keep the particle size completely from varying, and the variation index has a realistic lower limit on the order of 0.30.

In the [(D90−D10)/Mv] indicating the particle size variation index, D10 means a particle size at which the accumulated volume accounts for 10% of the total volume of all particles when the number of particles at each particle size is accumulated in order of increasing the particle size. In addition, D90 means a particle size at which the accumulated volume accounts for 90% of the total volume of all particles when the number of particles is accumulated in the same way. The volume average particle size Mv and D90 and D10 can be measured with the use of a laser diffraction-scattering type particle size analyzer.

The nickel composite hydroxide as described above characteristically includes plate-shaped secondary particles aggregated with overlaps between plate surfaces of multiple plate-shaped primary particles, where the shapes projected from directions perpendicular to the plate surfaces of the plate-shaped primary particles are any plane projection shape of spherical, elliptical, oblong, and massive shapes, and the secondary particles have an aspect ratio of 3 to 20, and a volume average particle size (Mv) of 4 μm to 20 μm measured by a laser diffraction scattering method.

This nickel composite hydroxide is preferred as a precursor for a positive electrode active material of a non-aqueous electrolyte secondary battery. More specifically, the use of the nickel composite hydroxide as a precursor for a positive electrode active material can increase, because the hydroxide has features as described above, the area of contact with an electrolytic solution, thereby achieving a positive electrode active material with a high filling density. As a result, this nickel composite hydroxide can form a thin electrode film, thereby achieving high output characteristics and battery capacity, and thus achieving a positive electrode active material for a non-aqueous electrolyte secondary battery which has a high electrode density.

<1-2> Process for Producing Nickel Composite Hydroxide

The process for producing the nickel composite hydroxide is intended to produce, through a crystallization reaction, a nickel composite hydroxide represented by the general formula (1): $Ni_{1-x-y-z}Co_xMn_yM_z(OH)_{2+A}$ (x, y, z, and A in the formula fall within ranges of: $0<x\leq0.35$; $0\leq y\leq0.35$; $0\leq z\leq0.1$; and $0\leq A\leq0.5$, x, y, and z meet $0<x+y+z\leq0.7$, and M in the formula represents at least one additive element selected from V, Mg, Al, Ti, Mo, Nb, Zr, and W).

<1-2-1> Nucleation Step and Particle Growth Step

The process for producing the nickel composite hydroxide includes: as shown in FIG. 1, a nucleation step of generating plate-shaped crystal nuclei from an aqueous solution for nucleation, which includes a metal compound containing cobalt, where the content of cobalt is 90 atom % or more with respect to all metal elements; and a particle growth step of causing growth of the plate-shaped crystal nuclei formed in the nucleation step.

In this regard, conventional crystallization methods cause a nucleation reaction and a particle growth reaction to proceed simultaneously in the same tank. For this reason, it has been difficult for the conventional crystallization methods to control particle shapes, due to isotropic growth of composite hydroxide particles obtained.

In contrast, the process for producing the nickel composite hydroxide according to the present embodiment carries out, in a clearly separated manner, the nucleation step of generating plate-shaped crystal nuclei mainly by a nucleation reaction, and the particle growth step of causing growth of particles mainly on both sides of the plate-shaped crystal nuclei. Thus, the process for producing the nickel composite hydroxide can control the particle shape of the nickel composite hydroxide obtained. Methods for the separation can include a method of changing the pH value for the nucleation step and the pH value for the particle growth step, and a method of changing the reaction tank for the nucleation step and the reaction tank for the particle growth step, as will be described later.

(Nucleation Step)

In the nucleation step, an aqueous solution for nucleation, which is obtained by dissolving a metal compound containing cobalt in water in a predetermined proportion, is controlled such that the pH value on the basis of a liquid temperature of 25° C. is 12.5 or more, thereby generating plate-shaped crystal nuclei.

The crystal nuclei correspond to the concentration layer of cobalt as described above, that is, a layer containing a high concentration of cobalt, which can also contain metal elements other than cobalt. In order to develop plate-shaped fine crystal nuclei, the content of cobalt included in the crystal nuclei is adjusted to 90 atomic % or more, more preferably 95 atomic % or more with respect to all of the metal elements. In order to fully develop fine plate-shaped crystal nuclei, the crystal nuclei preferably include only a hydroxide of cobalt.

In the nucleation step, first, an aqueous solution for nucleation is prepared by dissolving, in water, a metal compound containing cobalt and other metal compounds so as to reach the composition of the crystal nuclei.

Next, an inorganic alkaline aqueous solution is added to the prepared aqueous solution for nucleation, thereby controlling the pH value of the aqueous solution for nucleation so as to be 12.5 or more on the basis of a liquid temperature of 25° C., and lower than the pH in the nucleation step. The pH value of the aqueous solution for nucleation is measurable with a common pH meter.

In the nucleation step, with the desired composition of the aqueous solution for nucleation, the pH value is adjusted to 12.5 or more at a liquid temperature of 25° C., thereby developing a plate-shaped nucleus, and generating a fine plate-shaped crystal nucleus on a preferential basis. Thus, in the nucleation step, fine plate-shaped crystal nuclei for a composite oxide containing cobalt are generated in the aqueous solution for nucleation, thereby providing plate-shaped crystal nuclei-containing slurry (also referred to as "plate-shaped crystal nucleus slurry").

Figure 2:
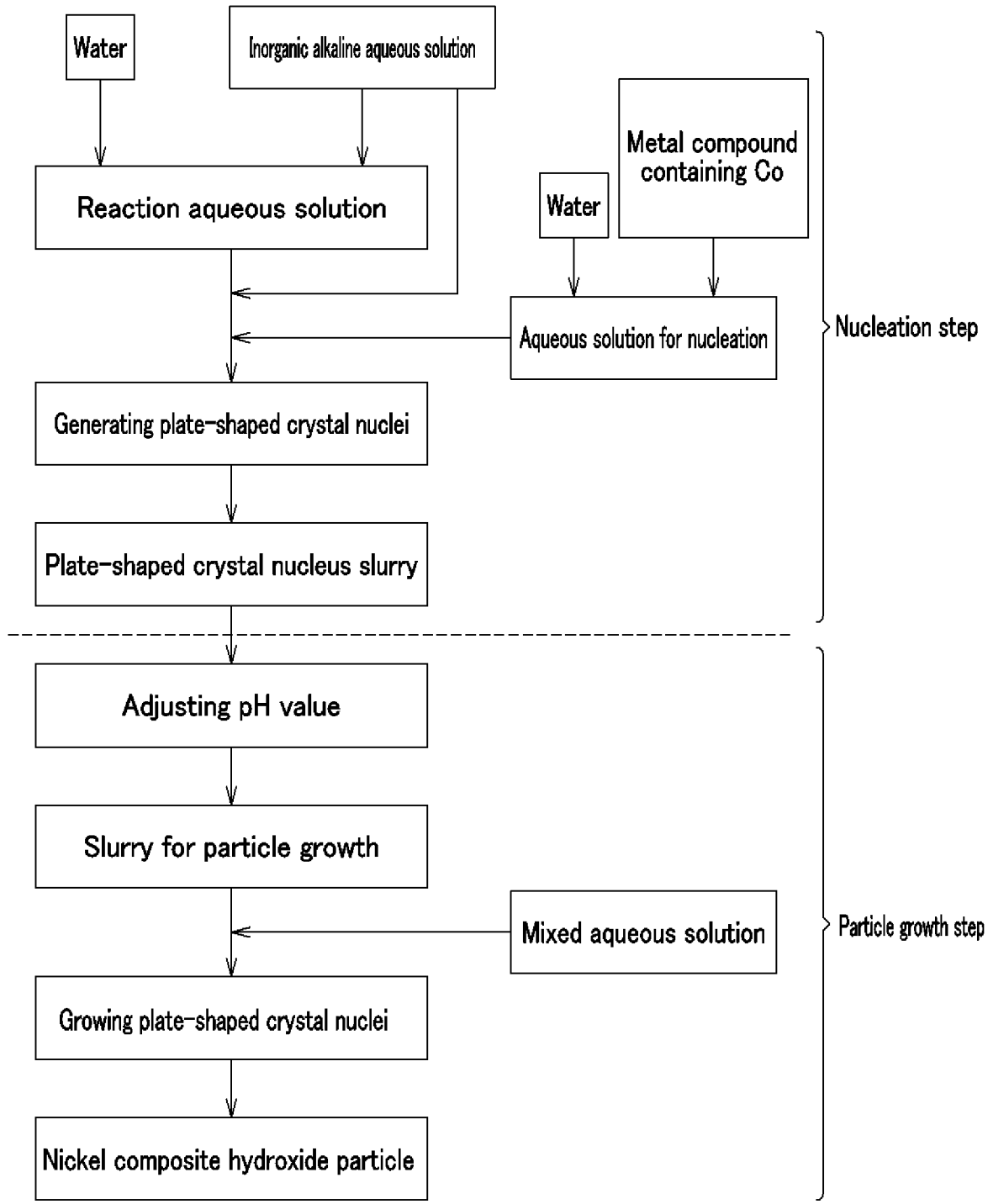
FIG. 2 is a flowchart showing a process for producing a nickel composite hydroxide in accordance with the present invention applied, which differs in nucleation step from the production process shown in FIG. 1.

The nucleation step is not limited to the process shown in FIG. 1, but may be carried out in accordance with, for example, a process as shown in FIG. 2. In the nucleation step shown in FIG. 1, the inorganic alkaline aqueous solution is added directly to the aqueous solution for nucleation, thereby generating the plate-shaped crystal nuclei.

On the other hand, in the nucleation step shown in FIG. 2, while stirring, in a reaction tank, a reaction aqueous solution with a pH value adjusted to 12.5 or more by adding water to an inorganic alkaline aqueous solution in advance, an aqueous solution for nucleation is supplied thereto, thereby generating plate-shaped crystal nuclei while maintaining the pH value with the addition of the inorganic alkaline aqueous solution, and thus providing plate-shaped crystal nucleus slurry. The process of supplying the aqueous solution for nucleation while maintaining the pH value of the reaction aqueous solution is preferred, because the process can strictly control the pH value, thereby easily generating plate-shaped crystal nuclei.

When predetermined amounts of crystal nuclei are generated in the plate-shaped crystal nucleus slurry from the aqueous solution for nucleation and the inorganic alkaline aqueous solution in the nucleation steps shown in FIGS. 1 and 2, the nucleation steps are completed. Whether predetermined amounts of crystal nuclei are generated or not is determined by the amounts of metal salts added to the aqueous solution for nucleation.

The amounts of nuclei generated in the nucleation steps are not to be considered particularly limited, but preferably 0.1% to 2%, preferably 0.1% to 1.5% of the total amount, that is, the total metal salt supplied for obtaining the nickel composite hydroxide particles, in order to obtain nickel composite hydroxide particles where the shape-specifying values described above fall within the respective ranges.

(Particle Growth Step)

Next, the process proceeds to the particle growth step. In the particle growth step, after the completion of the nucleation step, the pH value of the plate-shaped crystal nucleus slurry in the reaction tank is adjusted so as to be 10.5 to 12.5, preferably 11.0 to 12.0 on the basis of a liquid temperature of 25° C., and lower than the pH in the nucleation step, thereby providing slurry for particle growth in the particle growth step. Specifically, the pH value is controlled by adjusting the amount of the inorganic alkaline aqueous solution supplied. It is to be noted that the particle growth steps shown in FIGS. 1 and 2 are carried out in the same way.

In the particle growth step, a mixed aqueous solution including a metal compound containing at least nickel is supplied to the slurry for particle growth. The mixed aqueous solution contains, in addition to the metal compound containing nickel, a metal compound containing cobalt, manganese, or an additive element, if necessary, so as to achieve a nickel composite hydroxide with a predetermined composition ratio. In the particle growth step, the composition ratio of metals in primary particles that grow with the plate-shaped crystal nuclei as nuclei is equal to the composition ratio of respective metals in the mixed aqueous solution. On the other hand, in the nucleation step, the composition ratio of metal in the plate-shaped crystal nuclei is equal to the composition ratio of respective metals in the aqueous solution for nucleation. Therefore, an adjustment is made such that the total of the metal salt for use in the nucleation step and the metal salt in the mixed aqueous solution for use in the particle growth step provides the composition ratio of respective metals in the nickel composite hydroxide.

In the particle growth step, the pH value of the slurry for particle growth is made in the range of 10.5 to 12.5, preferably 11.0 to 12.0 on the basis of a liquid temperature of 25° C., and made lower than the pH of the nucleation step, thereby coming to cause the growth reaction of crystal nuclei preferentially rather than the generation reaction for crystal nuclei. Thus, in the particle growth step, the plate-shaped crystal nuclei come to undergo particle growth, almost without new nucleation in the slurry for particle growth.

In the particle growth step, in order to cause the produced nickel composite hydroxide to have the composition shown in the general formula (1) described above, the content of cobalt in the mixed aqueous solution is made lower than that in the aqueous solution for nucleation, without generating fine plate-shaped crystal nuclei. Thus, the plate-shaped crystal nuclei undergo particle growth to form plate-shaped primary particles that have, in central parts thereof, a high-concentration layer containing cobalt, and the primary particles aggregate so as to overlap each other, thereby providing nickel composite hydroxide particles.

Because the pH value of the slurry for particle growth varies with the particle growth through the supply of the mixed aqueous solution, the inorganic alkaline aqueous solution is also supplied to the slurry for particle growth, besides to the mixed aqueous solution, thereby controlling the pH value of the slurry for particle growth so as to keep the range of 10.5 to 12.5 on the basis of a liquid temperature of 25° C.

Thereafter, when the nickel composite hydroxide particles grow to a predetermined particle size and aspect ratio, the particle growth step is completed. The particle size and aspect ratio for the nickel composite hydroxide particles can be determined easily from the additive amounts of the metal salts in the respective steps, when a preliminary test is carried out to obtain the relationship between the additive amounts of metal salts respectively for use in the respective steps of the nucleation step and particle growth step and particles obtained.

As described above, in the process for producing the nickel composite hydroxide, plate-shaped crystal nuclei are generated preferentially in the nucleation step, and thereafter, in the particle growth step, the growth to plate-shaped primary particles and the generation of secondary particles by the aggregation of the plate-shaped primary particles are caused only, almost without generating new crystal nucleation. Thus, homogeneous plate-shaped crystal nuclei can be formed in the nucleation step, and the plate-shaped crystal nuclei are allowed to undergo particle growth homogeneously in the particle growth step. In addition, the growth to plate-shaped primary particles proceeds homogeneously without nucleation, and the aggregation of the plate-shaped primary particles thus also proceeds homogeneously. Accordingly, in the above-described process for producing the nickel composite hydroxide, homogeneous nickel composite hydroxide particles can be obtained which are controlled into a desired shape with a narrow range of particle size distribution.

It is to be noted that in the process for producing the nickel composite hydroxide, metal ions are crystallized as plate-shaped crystal nuclei or composite hydroxide particles in the both steps, thus increasing the proportion of the liquid component to the metal component in each slurry. In this case, apparently, the concentrations of the metal salts supplied are decreased, and in particular, in the particle growth step, there is a possibility that composite hydroxide particles will grow insufficiently.

Therefore, in order to keep the liquid component from being increased, the work of partially eliminating, from the reaction tank, the liquid component in the slurry for particle growth is preferably conducted between after the completion of the nucleation step and in the process of particle growth step. Specifically, for example, the supply of the inorganic alkaline aqueous solution and mixed aqueous solution to the slurry for particle growth, and stirring are stopped once, thereby causing the plate-shaped crystal nuclei and the nickel composite hydroxide particles to settle out, and supernatant is eliminated from the slurry for particle growth. This work can increase the relative concentration of the mixed aqueous solution in the slurry for particle growth. Further, with the increased relative concentration of the mixed aqueous solution, nickel composite hydroxide particles are allowed to grow, thus making it possible to make the particle size distribution of the nickel composite hydroxide particles narrower, and also increase the density of the nickel composite hydroxide particles as whole secondary particles.

In addition, in the particle growth steps shown in FIGS. 1 and 2, the pH value of the plate-shaped crystal nucleus slurry obtained in nucleation step is adjusted to obtain slurry for particle growth, thereby carrying out the particle growth steps continuously from the nucleation steps, and the processes thus have the advantage of being able to proceed to the particle growth steps rapidly. Furthermore, the processes can proceed from the nucleation steps to the particle growth steps just through the adjustment of the pH value of the plate-shaped crystal nucleus slurry, and have the advantage of being also able to adjust the pH value easily by only temporarily stopping the supply to the inorganic alkaline aqueous solution, or adding a sulfuric acid to the plate-shaped crystal nucleus slurry in the case of the same type of inorganic acid as the acid constituting the metal compound, for example, a sulfate.

Figure 3:
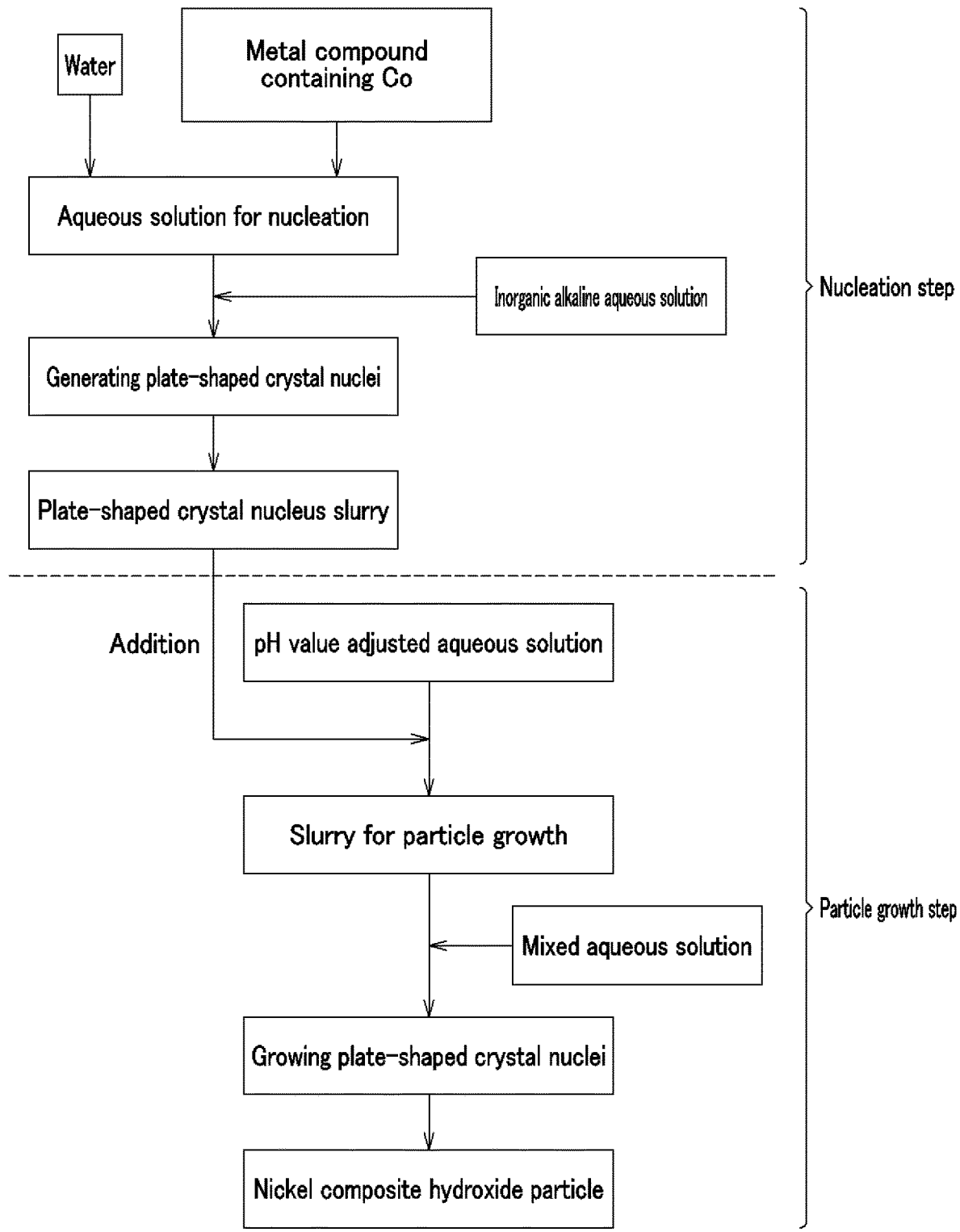
FIG. 3 is a flowchart showing a process for producing a nickel composite hydroxide in accordance with the present invention applied, which differs in particle growth step from the production process shown in FIG. 1.

In this regard, the particle growth step is not limited to the processes shown in FIGS. 1 and 2, but may be the process shown in FIG. 3. The nucleation step shown in FIG. 3 can be achieved by adding an inorganic alkaline aqueous solution directly to an aqueous solution for nucleation in the same way as the nucleation step shown in FIG. 1, or stirring a reaction aqueous solution and supplying an aqueous solution for nucleation while adjusting the pH value in the same way as the nucleation step shown in FIG. 2.

In the particle growth step shown in FIG. 3, separately from plate-shaped crystal nucleus slurry, an aqueous solution for pH value adjustment is prepared which is adjusted with the inorganic alkaline aqueous solution to a pH value suitable for the particle growth step. Then, plate-shaped crystal nucleus slurry produced by carrying out the nucleation step in a separate reaction tank, preferably the plate-shaped crystal nucleus slurry with a liquid component partially removed therefrom as described above, is added to the aqueous solution for pH value adjustment, thereby providing slurry for particle growth. The particle growth step is carried out in the same way as the particle growth steps shown in FIGS. 1 and 2 with the use of the slurry for particle growth.

The process for producing the nickel composite hydroxide as shown in FIG. 3 can separate the nucleation step and the particle growth step in a more reliable manner, and thus turn the condition of the reaction aqueous solution in each step into an optimal condition for each step. In particular, from the start point of the particle growth step, the pH value of the slurry for particle growth can be turned into an optimal condition. The nickel composite hydroxide obtained in the particle growth step can be adapted to have a narrower range of particle size distribution, and made homogeneous.

<1-2-2> Control of pH and Reaction Atmosphere, Particle Size, Ammonia Concentration Next, the control of the pH and reaction atmosphere, the particle size of the nickel composite hydroxide, and the ammonia concentration in each step will be described in detail.

(pH Control in Nucleation Step)

As described above, in the nucleation steps in FIGS. 1 to 3, there is a need to control the pH value of the aqueous solution for nucleation so as to fall within the range of 12.5 or more on the basis of a liquid temperature of 25° C. When the pH value on the basis of a liquid temperature of 25° C. is less than 12.5, plate-shaped crystal nuclei themselves increase while the crystal nuclei are generated, thus failing to obtain plate-shaped secondary particles with plate-shaped primary particles aggregated in the subsequent particle growth step. On the other hand, finer plate-shaped crystal nuclei are obtained as the pH value is larger, but when the pH value exceeds 14.0, problems may be caused, such as the reaction solution gelled, thereby making crystallization difficult, and excessively small plate-shaped primary particles of the nickel composite hydroxide. More specifically, in the nucleation step, the pH value of the aqueous solution for nucleation is adapted to fall within the range of 12.5 or more, preferably 12.5 to 14.0, more preferably 12.5 to 13.5, thereby making it possible to generate plate-shaped crystal nuclei sufficiently.

(pH Control in Particle Growth Step)

In the particle growth step, there is a need to control the pH value of the slurry for particle growth so as to fall within the range of 10.5 to 12.5, preferably 11.0 to 12.0 on the basis of a liquid temperature 25° C., and to be lower than the pH in the nucleation step. When the pH value on the basis of a liquid temperature of 25° C. is less than 10.5, there are more impurities included in the nickel composite hydroxide obtained, for example, more anion constituent elements included in the metal salts. Alternatively, when the value exceeds pH 12.5, new crystal nuclei will be generated in the particle growth step, thereby worsening the particle size distribution. More specifically, in the particle growth step, the pH value of the slurry for particle growth is controlled to fall within the range of 10.5 to 12.5 and to be lower than the pH in the nucleation step, thereby making it possible to cause only growth of the plate-shaped crystal nuclei generated in the nucleation step to plate-shaped primary particles and aggregation of the plate-shaped primary particles on a preferential basis, and inhibit new crystal nucleation, and the nickel composite hydroxide obtained can be adapted to be homogeneous, narrow in particle size distribution range, and controlled in shape. In order to separate the nucleation and the particle growth in a clearer manner, the pH value of the slurry for particle growth is preferably controlled to be lower than the pH in the nucleation step by 0.5 or more, more preferably 1.0 or more.

In each of the nucleation step and particle growth step, the range of variation in pH preferably falls within +0.2 from the set value. When the range of variation in pH is large, the nucleation and the particle growth may fail to stay steady, thereby failing to obtain homogeneous nickel composite hydroxide particles that are narrow in particle size distribution range.

(Reaction Atmosphere in Nucleation Step)

In the nucleation step, nucleation is developed in a non-oxidizing atmosphere with an oxygen concentration of 5 volume % or less, preferably 2 volume % or less. Thus, the oxidation of cobalt is inhibited, and the production of a plate-shaped single-crystalline hydroxide is promoted to generate fine plate-shaped crystal nuclei. As the oxygen concentration is higher, the plate-shaped crystal nuclei tend to be thicker, and when the oxygen concentration exceeds 5 volume %, spherical or massive nuclei with fine crystals aggregated are provided, thereby failing to obtain plate-shaped crystal nuclei. As the plate-shaped crystal nuclei are thicker, the aspect ratio of the composite hydroxide obtained is decreased. The non-oxidizing atmosphere is considered defined by the aqueous solution during the generation of crystal nuclei, or the oxygen concentration in the atmosphere in contact with the plate-shaped crystal nucleus slurry. In order to develop the crystal nucleus into a plate shape, the oxygen concentration is preferably adjusted to 2 volume % or less, and more preferably, the oxygen concentration is adjusted to 1 volume % or less.

(Reaction Atmosphere in Particle Growth Step)

Also in the particle growth step, the adoption of an oxidizing atmosphere may fail to achieve dense primary particles of growing plate-shaped crystal nuclei, thereby decreasing the denseness of nickel composite hydroxide particles obtained. Therefore, the atmosphere for the particle growth, that is, the atmosphere in contact with the slurry for particle growth is preferably made an atmosphere with an oxygen concentration of 5 volume % or less, more preferably, an atmosphere with an oxygen concentration of 2 volume % or less, as with the nucleation step.

Means for keeping the space in the reaction tank in the reaction atmosphere described above in each step includes: circulating an inert gas such as nitrogen into the space in the reaction tank; and further bubbling an inert gas into the reaction solution.

(Particle Size of Nickel Composite Hydroxide)

The aspect ratio of the nickel composite hydroxide produced is correlated with the sizes of the crystal nuclei, and can be thus controlled by adjusting the pH value, reaction atmosphere, stirring force, and the like in the nucleation step. The inhibited oxidation, and thus the weakened stirring develop plate-shaped crystal nuclei, thereby making it possible to increase the aspect ratios of primary particles, and also increase the aspect ratio of the nickel composite hydroxide. In addition, the development of the plate-shaped crystal nuclei can increase plate-shaped primary particles in size.

In addition, the volume average particle size (Mv) can be controlled by the duration of the particle growth step, and thus, when the particle growth step is continued until growing to a desired particle size, nickel composite hydroxide particles can be obtained which have the desired particle size. More specifically, the above-mentioned shape-specifying values can be controlled to fall within the respective ranges by controlling the aspect ratio in the nucleation step, and adjusting the aggregation of primary particles in the particle growth step.

(Ammonia Concentration)

Ammonia is preferably added as a complexing agent to the slurry for particle growth in the particle growth step. In that regard, the ammonia concentration in the slurry for particle growth is preferably controlled to 5 g/L to 20 g/L. The ammonia acts as a complexing agent, and thus may, when the ammonia concentration is less than 5 g/L, fail to keep the solubility of metal ions constant, thereby resulting in ununiform plate-shaped primary particles of plate-shaped crystal nuclei developed, and causing the nickel composite hydroxide to vary in particle size. When the ammonia concentration exceeds 20 g/L, the solubility of the metal ions may be excessively increased, thereby increasing the amount of meal ions remaining in the slurry for particle growth, and thus causing the composition to be deviated, or the like.

In addition, when the ammonia concentration varies, the solubility of the metal ions will vary, thereby failing to form a uniform nickel composite hydroxide, and the concentration is preferably maintained at a constant value. For example, a desired concentration is preferably maintained, while the variation of the ammonia concentration has a range of an increase or a decrease on the order of 5 g/L with respect to the set concentration.

The ammonia is added with an ammonium ion supplier, but the ammonium ion supplier is not particularly limited, and for example, ammonia, ammonium sulfate, ammonium chloride, ammonium carbonate, ammonium fluoride, and the like can be used.

<1-2-3> Metal Compound Used, Reaction Condition, etc.

Next, the metal compound (metal salt) used and the conditions such as a reaction temperature will be described. It is to be noted that the differences in the conditions between the nucleation step and the particle growth step are only the pH value described above, and the control ranges of the compositions of the aqueous solution for nucleation and the mixed aqueous solution, and the both steps use substantially the same metal compound and conditions such as a reaction temperature.

(Metal Compound)

A compound containing the intended metal is used as the metal compound. It is preferable to use a water-soluble compound for the compound used, and examples of the water-soluble compound include metal salts such as nitrates, sulfates, and hydrochlorides. For example, nickel sulfate, manganese sulfate, and cobalt sulfate are preferably used.

(Additive Element)

It is preferable to use a water-soluble compound for the additive element (at least one additive element selected from V, Mg, Al, Ti, Mo, Nb, Zr, and W) in the general formula (1), and for example, vanadium sulfate, ammonium vanadate, magnesium sulfate, aluminum sulfate, titanium sulfate, ammonium peroxotitanate, potassium titanium oxalate, zirconium sulfate, zirconium nitrate, niobium oxalate, ammonium molybdate, sodium tungstate, ammonium tungstate, and the like can be used.

The addition of the additive element may be achieved by adding an additive containing the additive element to the aqueous solution for nucleation or the mixed aqueous solution, thereby making coprecipitation possible with the additive element uniformly dispersed in nickel composite hydroxide particles.

The additive element can be also added by coating the surface of the obtained nickel composite hydroxide with a compound containing the additive element. Further, in the case of coating the surface with the additive element, the ratio of the atom number of additive element ions that are present in the formation of the composite hydroxide by crystallization is reduced by a coating amount, thereby making it possible to make the ratio of the atom number of metal ions in the nickel composite hydroxide be in agreement with the final composition ratio. In addition, the step of coating the surface of the nickel composite hydroxide with the additive element may be applied to particles after heating the composite hydroxide.

(Concentration of Mixed Aqueous Solution in Particle Growth Step)

The concentration of the mixed aqueous solution is preferably adjusted to 1.0 mol/L to 2.6 mol/L, preferably 1.5 mol/L to 2.2 mol/L in the total of the metal compound. When the concentration of the mixed aqueous solution is less than 1.0 mol/L, productivity is unfavorably decreased because of the reduced amount of the crystallization product per reaction tank.

On the other hand, when the concentration of the mixed aqueous solution exceeds 2.6 mol/L, the concentration exceeds the saturation concentration at normal temperature, and there is thus a risk of clogging equipment piping due to reprecipitation of crystals.

In addition, the mixed aqueous solution does not necessarily have to be supplied to the reaction tank as a mixed aqueous solution containing all of metal compounds required for the reaction. For example, in the case of using metal compounds that react to produce a compound when the metal compounds are mixed, aqueous solutions of metal compounds may be prepared individually, and simultaneously supplied in predetermined proportions as individual aqueous solutions of metal compounds into the reaction tank such that the total concentration is 1.0 mol/L to 2.6 mol/L in all of the aqueous solution of metal compounds. The aqueous solution for nucleation in the nucleation step may be also adapted as in the case with the mixed aqueous solution.

(Reaction Solution Temperatures in Nucleation Step and Particle Growth Step)

The solution temperature of the reaction solution during the reaction in each step is preferably set to 20° C. or higher, particularly preferably 20° C. to 70° C. When the solution temperature is less than 20° C., nucleation is likely to be developed because of the low solubility, thereby increasing difficulty with control. In addition, fine particles may be generated by new nucleation in the particle growth step. On the other hand, in excess of 70° C., when ammonia is added, the volatilization of ammonia is promoted, and an excess ammonium ion supplier has thus to be added in order to keep a predetermined ammonia concentration, which leads to an increase in cost. When no ammonia is added, the temperature is preferably adjusted to 40° C. to 70° C. in order to make the solubility of metal ions adequate.

(Inorganic Alkaline Aqueous Solution in Nucleation Step and Particle Growth Step)

The inorganic alkaline aqueous solution for the adjustment of the pH value is not to be considered particularly limited, but for example, an aqueous solution of an alkali metal hydroxide such as sodium hydroxide and potassium hydroxide can be used. In the case of such an alkali metal hydroxide, the hydroxide may be supplied directly, but is preferably added as an aqueous solution, from the perspective of ease of pH control during crystallization.

In addition, the method for adding the inorganic alkaline aqueous solution is not to be considered particularly limited, but the solution may be added with a pump capable of flow control, such as a metering pump, such that the pH is kept in a predetermined range, while sufficiently stirring the reaction aqueous solution and the plate-shaped crystal nucleus slurry.

(Production Equipment)

The process for producing the nickel composite hydroxide uses a type of apparatus that collects no product until the reaction is completed. For example, a batch reaction tank equipped with a stirrer is used commonly. The adoption of a type of apparatus that collects no product until the reaction is completed can provide particles that are narrow in particle size distribution, and uniform in particle size, because the problem of collecting growing particles at the same time as overflow liquid is not caused unlike continuous crystallization apparatus that collects products through common overflows.

In addition, in the case of controlling the reaction atmosphere, it is preferable to use an apparatus capable of atmosphere control, such as an airtight apparatus. The use of such an apparatus can easily provide nickel composite hydroxides composed of plate-shaped secondary particles with plate-shaped primary particles aggregated as described above.

The production process for producing the nickel composite hydroxide as described above has: a nucleation step of generating plate-shaped crystal nuclei by adjusting an aqueous solution for nucleation, including a metal compound containing cobalt, where the content of cobalt is 90 atom % or more with respect to all metal elements, to an pH value of 12.5 or more on the basis of a liquid temperature of 25° C.; and a particle growth step of causing growth of the plate-shaped crystal nuclei by adjusting slurry for particle growth, containing the plate-shaped crystal nuclei formed in the nucleation step, such that the pH value of the slurry is 10.5 to 12.5 on the basis of a liquid temperature of 25° C., and lower than the pH value in the nucleation step, and supplying a mixed aqueous solution including a metal compound containing at least nickel to the slurry for particle growth, thereby making it possible to provide a characteristic nickel composite hydroxide as described above.

The process for producing the nickel composite hydroxide carries out the nucleation step and the particle growth step in a clearly separated manner, thereby making it possible to provide a characteristic nickel composite hydroxide as described above, and has extremely high industrial value, due to the fact that the process is easily implemented with high productivity, and thus suitable for production on an industrial scale.

[2] Positive Electrode Active Material for Non-Aqueous Electrolyte Secondary Battery and Production Process Therefor (2-1) Positive Electrode Active Material for Non-Aqueous Electrolyte Secondary Battery The positive electrode active material includes a lithium-nickel composite hydroxide that has a hexagonal layered structure, which is represented by the general formula (2): $Li_{1+u}Ni_{1-x-y-z}Co_xMn_yM_zO_2$ (in the formula, u, x, y, and z in the formula fall within ranges of: $-0.05 \leq u \leq 0.50$; $0 \leq x \leq 0.35$; $0 \leq y \leq 0.35$; and $0 \leq z \leq 0.1$, x, y, and z meet $0 < x+y+z \leq 0.7$, and M in the formula represents at least one additive element selected from V, Mg, Al, Ti, Mo, Nb, Zr, and W). The positive electrode active material has the lithium-nickel composite oxide including plate-shaped secondary particles aggregated with overlaps between plate surfaces of multiple plate-shaped primary particles, where shapes projected from directions perpendicular to the plate surfaces of the plate-shaped primary particles are any plane projection shape of spherical, elliptical, oblong, and massive shapes, and the secondary particles have an aspect ratio of 3 to 20, and a volume average particle size (Mv) of 4 μm to 20 μm measured by a laser diffraction scattering method.

The adoption of the composition as mentioned above can provide superior performance as a positive electrode active material for a non-aqueous electrolyte secondary battery. In addition, this positive electrode active material is composed of the plate-shaped secondary particles aggregated with overlaps between the plate surfaces of the multiple plate-shaped primary particles of the lithium-nickel composite oxide, thus making it possible to achieve the increased area of contact with an electrolytic solution, and a high filling density because of the plate shape. Thus, when this positive electrode active material is used for a positive electrode of a battery, high output characteristics and battery capacity are achieved, thereby making it possible to achieve a high electrode density.

(Composition)

In the positive electrode active material, u indicating the excessive amount of lithium meets $-0.05 \leq u \leq 0.50$. When the excessive amount u of lithium is less than $-0.05$, that is, the content of lithium is lower than 0.95, the reaction resistance of a positive electrode will be increased in a non-aqueous electrolyte secondary battery that uses the positive electrode active material obtained, thereby decreasing the output of the battery.

On the other hand, when the excessive amount u of lithium exceeds 0.50, that is, the content of lithium is higher than 1.50, the initial discharge capacity will be decreased in the case of using the positive electrode active material for a positive electrode of a battery, and the reaction resistance of the positive electrode will be also increased. The excessive amount u of lithium is preferably adjusted to 0.10 or more, and preferably adjusted to 0.35 or less in order to further reduce the reaction resistance.

x indicating the content of cobalt meets $0 < x \leq 0.35$. Cobalt is an additive element that contributes to improved cycle characteristics. When the value of x exceeds 0.35, the initial discharge capacity will be decreased significantly. As described above, the nickel composite hydroxide as a precursor for use in the production of the positive electrode active material is developed from plate-shaped crystal nuclei of a hydroxide containing at least cobalt, and x thus meets $0 < x$, preferably $0.05 \leq x \leq 0.35$, more preferably $0.1 \leq x \leq 0.35$.

y indicating the content of manganese meets $0 \leq y \leq 0.35$. Manganese is an additive element that contributes to improved thermal stability. When the value of y exceeds 0.35, characteristic degradation will be caused, because of manganese eluted into an electrolytic solution in storage at high temperatures or in battery operation.

As expressed by the general formula (2), the positive electrode active material is more preferably adjusted such that the lithium-nickel composite oxide contains therein the additive element. Containing the additive element can improve durability and output characteristics of a battery that uses the oxide as a positive electrode active material. In particular, the additive element uniformly distributed on the surfaces of particles or in the particles allows the whole particles to achieve the advantageous effects, and the addition of small amount of the element can achieve the advantageous effects, and keep the capacity from being decreased.

When the atom ratio z of the additive element M to the total number of atoms exceeds 0.1, the battery capacity is unfavorably decreased because of the decreased amount of a metal element that contributes to a Redox reaction. Accordingly, the atom ratio of the additive element M is adjusted to fall within the range of $0 \leq z \leq 0.1$.

(Particle Shape and Structure)

The positive electrode active material uses the nickel composite hydroxide composed of plate-shaped secondary particles aggregated with overlaps between plate surfaces of multiple plate-shaped primary particles of the above-described nickel composite hydroxide as a precursor, where the shapes projected from directions perpendicular to plate surfaces of the plate-shaped primary particles are any plane projection shape of circular, elliptical, oblong, and potato-like massive shapes. Accordingly, the positive electrode active material has a similar particle structure to the nickel composite hydroxide.

In the positive electrode active material that has this structure, the surfaces of primary particles in secondary particles also have sufficient voids generated as in the case with the nickel composite hydroxide. Accordingly, the specific surface area is increased as compared with common plate-shaped particles composed of plate-shaped secondary particles formed as polycrystalline bodies of primary particles. In addition, each individual primary particle has a small particle size, thus making it easy to insert and extract lithium, and thus increasing the insertion and extraction rates. Furthermore, the secondary particles are formed from constituent particles with primary particles aggregated, thus making it possible to deliver an electrolyte sufficiently in the secondary particles, and lithium is inserted and extracted at voids and grain boundaries present between the primary particles. These advantageous effects bring output characteristics close to those in the case of particles that are small in particle size, thereby making a more significant improvement than in the case of plate-shaped particles.

On the other hand, because the individual secondary particles aggregate with overlaps between plate surfaces, thereby growing two-dimensionally, filling with the secondary particles oriented in electrode preparation can reduce the gaps between the particles, which are found in the case of filling with particles that are small in particle size, thereby making it possible to achieve a high filing density, and thus achieving a high volume energy density. In addition, it also becomes possible to make the electrode a thin film. Accordingly, the use of the positive electrode active material composed of plate-shaped secondary particles with a plurality of plate-shaped primary particles of the nickel composite hydroxide aggregated with overlaps between plate surfaces as described above makes it possible to achieve a balance between high output characteristics and battery capacity, and a high electrode density.

The secondary particles of the positive electrode active material have an aspect ratio of 3 to 20, and the positive electrode active material has a volume average particle size (Mv) of 4 μm to 20 μm measured by a laser diffraction scattering method.

When the aspect ratio is less than 3, flatness of the plate shape is decreased, and results in failure to achieve a high filling density with particles oriented in electrode preparation. In addition, the resistance increased against diffusion of lithium into particles will degrade output characteristics. On the other hand, when the aspect ratio exceeds 20, the decreased particle strength of the secondary particles will result in easily broken particles in kneading slurry for electrode preparation, thereby insufficiently producing the effect of the plate shape. In addition, the filling density for the electrode will be also decreased, thereby decreasing the volume energy density.

The volume average particle size (Mv) of less than 4 μm will increase gaps between secondary particles in filling even when the particles have a plate shape, thus decreasing the volume energy density. In addition, the viscosity will be increased in kneading slurry for electrode preparation, thereby causing a decrease in handling ability. The volume average particle size (Mv) in excess of 20 μm will cause lineation in the preparation of an electrode film, and a short circuit through a separator. The volume average particle size (Mv) in the range of 4 μm to 20 μm can provide a positive electrode active material which provides an electrode with a high volume energy density, and suppresses lineation in the preparation of an electrode film and a short circuit through a separator.

Furthermore, in the positive electrode active material, the average value is preferably 1 to 5 μm for the maximum diameters of shapes projected from directions perpendicular to plate surfaces of plate-shaped primary particles (the maximum diameters of plate-shaped primary particles projected from directions perpendicular to plate surfaces of secondary particles). Thus, because lithium is inserted and extracted at voids and grain boundaries present between the plate-shaped primary particles, output characteristics are brought close to those in the case of particles that are small in particle size, thereby making a more significant improvement than in the case of plate-shaped particles. When the average value is less than 1 μm for the maximum diameters of the plate-shaped primary particles, the gaps between the plate-shaped primary particles will be excessively increased, thereby decreasing the denseness of the secondary particles, and an insufficient filling density may be achieved. On the other hand, when the average value for the maximum diameters exceeds 5 μm, such advantageous effects may be achieved insufficiently, which are achieved in the case of filling with particles that are small in particle size. The shape-specifying values (aspect ratio, Mv) and the average value for the maximum diameters of the plate-shaped primary particles can be obtained in the same way as the nickel composite hydroxide to serve as a precursor.

(Specific Surface Area)

The positive electrode active material preferably has a specific surface area of 0.3 m$^2$/g to 2 m$^2$/g. When the specific surface area is less than 0.3 m$^2$/g, the contact with an electrolytic solution may be achieved insufficiently, thereby resulting in degraded output characteristics and battery capacity. Alternatively, when the specific surface area exceeds 2 m$^2$/g, the decomposition of an electrolytic solution may be accelerated, thereby resulting in safety deterioration, or causing high-temperature storage stability to be decreased by manganese elution when manganese is added. The adjustment of the specific surface area to 0.3 m$^2$/g to 2 m$^2$/g achieves favorable battery characteristics, and can also ensure safety and high-temperature storage stability.

(Particle Size Distribution)

The positive electrode active material is preferably 0.75 or less in [(D90−D10)/Mv] indicating a particle size variation index, which is calculated from D90 and D10 in a particle size distribution obtained by a laser diffraction scattering method and the volume average particle size (Mv).

When the positive electrode active material has a wide particle size distribution, the positive electrode active material is supposed to have many fine particles that are very small in particle size with respect to the average particle size, and many coarse particles that are very large in particle size with respect to the average particle size. When a positive electrode is formed with the use of a positive electrode active material that has many fine particles, there is a possibility of heat generation due to local reactions between the fine particles, the fine particles are likely to undergo selective degradation, with safety deterioration, and cycle characteristics may be thus worsened. On the other hand, when a positive electrode is formed with the use of a positive electrode active material that has many coarse particles, the coarse particles decrease the area of a reaction between a electrolytic solution and the positive electrode active material, and the battery output may be thus decreased by an increase in reaction resistance. When the variation index is lower, the positive electrode active material can be improved in property, but the variation index has a realistic lower limit on the order of 0.30 according to the present invention.

Accordingly, the particle size distribution of the positive electrode active material is adjusted to 0.75 or less in [(D90−D10)/Mv] indicating the particle size variation index, thereby making it possible to reduce the proportions of fine particles and coarse particles. The battery that uses the foregoing positive electrode active material for a positive electrode is further excellent in safety, and adapted to have more favorable cycle characteristics and battery output. It is to be noted that the average particle size, and D90 and D10 are specified as in the case of the composite hydroxide particles described above, and the measurement method therefor can be also adopted in the same way.

Furthermore, the positive electrode active material preferably has a site occupancy of 7% or less at 3a sites with metal ions other than lithium, and a site occupancy of 7% or less at 3b sites with lithium ions, which are obtained from Rietveld analysis with X-ray diffraction analysis. The site occupancies at the 3a sites and the 3b sites beyond the foregoing range indicate that the lithium-nickel composite oxide is brought into cation mixing, with low crystallinity. In the case of low crystallinity, the metal ions at the 3a sites significantly interfere with movement of lithium ions, and deactivation of the lithium ions at the 3b sites has significant influence, which may degrade battery characteristics, in particular, charge-discharge capacity or output characteristics.

In addition, the positive electrode active material preferably has an orientation index of 0.9 to 1.1 at the (003) plane, which is found by X-ray diffraction analysis. This orientation index presented means that crystals are arranged in a non-orientation and random manner. The non-orientation of crystals can achieve a balance between battery capacity and output characteristics affected by the insertion-extraction ability of lithium, and cycle characteristics and safety affected by durability of the layered structure. The deviation of the orientation index at the (003) plane to either side may result in failure to achieve a balance between the characteristics required as a battery in high dimensions, thereby insufficiently achieving any of the battery characteristics.

In addition, this lithium-nickel composite oxide is composed of secondary particles where spherical or massive lithium-nickel composite oxide particles formed by the aggregation of primary particles are connected in two-dimensional directions, thus making it possible to achieve the increased area of contact with an electrolytic solution, and a high filling density because of the plate shape. Therefore, when this lithium-nickel composite oxide is used as a positive electrode active material, high output characteristics and battery capacity are achieved, thereby making it possible to achieve a high electrode density.

The positive electrode active material as described above has the lithium-nickel composite oxide characteristically including plate-shaped secondary particles aggregated with overlaps between plate surfaces of multiple plate-shaped primary particles, where the shapes projected from directions perpendicular to the plate surfaces of the plate-shaped primary particles are any plane projection shape of spherical, elliptical, oblong, and massive shapes, and the secondary particles have an aspect ratio of 3 to 20, and a volume average particle size (Mv) of 4 μm to 20 μm measured by a laser diffraction scattering method.

The positive electrode active material is produced from the nickel composite hydroxide which is characteristic as described above and a lithium compound, and thus adapted to take over the composition and properties of the nickel composite hydroxide. Accordingly, the foregoing positive electrode active material increases the area of contact with an electrolytic solution, and produces an increased filling density for a positive electrode. As a result, with the positive electrode active material as described above, thin electrode films can be formed, and non-aqueous electrolyte secondary batteries can be obtained which achieve high output characteristics and battery capacity and has a high electrode density.

(2-2) Process for Producing Positive Electrode Active Material for Non-Aqueous Electrolyte Secondary Battery The process for producing the positive electrode active material at least includes: a mixing step of forming a mixture by mixing a lithium compound with the nickel composite hydroxide described above; and a calcining step of calcining the mixture formed in the mixing step.

The process for producing the positive electrode active material is not particularly limited as long as the positive electrode active material can be produced such that the secondary particles have a shape, a structure, and a composition as described above, but it is preferable to adopt the following method because the positive electrode active material can be produced more reliably. The respective steps will be described below.

(a) Heat Treatment Step

First, the nickel composite hydroxide prepared in the way described above is subjected to a heat treatment, if necessary.

The heat treatment step is a step of heating the nickel composite hydroxide to a temperature of 300° C. to 750° C. in an oxidizing atmosphere, thereby carrying out a heat treatment, which removes water contained in the nickel composite hydroxide. This heat treatment step is carried out, thereby making it possible to reduce water in the particles, remaining up to the calcining step, down to a certain amount of water. Thus, the positive electrode active material produced can be prevented from varying in the ratio of the metal atom number or lithium atom number in the material. Accordingly, this step can be skipped as long as the ratio between the metal atom number and the lithium atom number in the positive electrode active material can be controlled precisely.

In the heat treatment step, water has only to be able to be removed without varying in the ratio between the metal atom number and the lithium atom number in the positive electrode active material, and thus, the nickel composite hydroxide does not necessarily have to be all converted to a nickel composite oxide. However, in order to further reduce the variation in the ratio between the atom numbers, the nickel composite hydroxide is preferably all converted to a nickel composite oxide with the heating temperature adjusted to 500° C. or higher.

In the heat treatment step, when the heating temperature is lower than 300° C., excess water in the nickel composite hydroxide can be removed insufficiently, and the ratio between the atom numbers may be kept insufficiently from varying. On the other hand, when the heating temperature exceeds 750° C., the heat treatment may make the particles be sintered, thereby resulting in failure to obtain any nickel composite oxide that is uniform in particle size. The ratio between the atom numbers can be kept from varying, in a way that the metal component contained in the nickel composite hydroxide under the heat treatment condition is found in advance by analysis, thereby determining the ratio between the metal component and the lithium compound.

The atmosphere in which the heat treatment is carried out is not to be considered particularly limited, but has only to be an atmosphere that is not reduced, that is, a non-reducing atmosphere, and the heat treatment is preferably carried out in an oxidizing atmosphere, in particular, in an air flow where the heat treatment is carried out in a simplified manner.

In addition, the heat treatment time is not particularly limited, but preferably at least 1 hour or more, more preferably 5 hours to 15 hours, because excess water in the nickel composite hydroxide may be removed insufficiently for shorter than 1 hour.

Further, the equipment for use in the heat treatment is not to be considered particularly limited, but may be any equipment as long as the equipment can heat the nickel composite hydroxide in a non-reducing atmosphere, preferably in an air flow, and an electric furnace without gas generation or the like is used in a preferred manner.

(b) Mixing Step

The mixing step is a step of mixing the nickel composite hydroxide or the nickel composite hydroxide subjected to the heat treatment in the heat treatment step (hereinafter, referred to as "heat-treated particles") with a lithium compound, thereby providing a lithium mixture.

In this regard, the heat-treated particles include not only the nickel composite hydroxide with residual water removed therefrom in the heat treatment step, but also the nickel composite hydroxide converted to an oxide in the heat treatment step, or mixed particles.

The nickel composite hydroxide or heat-treated particles and the lithium compound are mixed such that the ratio (Li/Me) of the lithium atom number (Li) to the atom number of metals other than lithium, that is, the sum (Me) of the atom numbers of nickel, manganese, cobalt, and the additive element M in the lithium mixture is 0.95 to 1.5, preferably 1 to 1.5, more preferably 1 to 1.35. More specifically, the Li/Me of mixing in the mixing step corresponds to the Li/Me in the positive electrode active material because the Li/Me is not changed between before and after the calcining step, and the mixing is carried out such that the Li/Me in the lithium mixture is equal to the Li/Me in the positive electrode active material to be obtained.

The lithium compound used for forming the lithium mixture is not to be considered particularly limited, but for example, lithium hydroxide, lithium nitrate, lithium carbonate, or mixtures thereof are preferred in terms of being easily available. In particular, in consideration of ease of handling and quality stability, it is more preferable to use lithium hydroxide or lithium carbonate.

It is to be noted that the lithium mixture is preferably mixed sufficiently before the calcination. In the case of insufficient mixing, there is a possibility that the Li/Me will vary among individual particles, thereby causing problems such as failure to achieve adequate battery characteristics.

In addition, for the mixing, common mixing machines can be used, and for example, shaker mixers, Loedige mixers, Julia mixers, and V blenders can be used. The mixing has only to mix the nickel composite hydroxide and the heat-treated particles sufficiently with the lithium compound, to the extent that the nickel composite hydroxide or heat-treated particles are not broken in shape.

(c) Calcining Step

The calcining step is a step of calcining the lithium mixture obtained in the mixing step, thereby forming a lithium-nickel composite oxide. Calcining the lithium mixture in the calcining step diffuses the lithium in the lithium compound into the nickel composite hydroxide and the heat-treated particles, thus forming lithium-nickel composite oxide particles. In addition, even when the nickel composite hydroxide has a high concentration layer of cobalt, the diffusion causes the high concentration layer to disappear, thereby eliminating the presence of structural layered products.

(Calcination Temperature)

The lithium mixture is calcined at 650° C. to 980° C., more preferably 750° C. to 950° C. The calcination temperature of lower than 650° C. insufficiently diffuses lithium into the nickel composite hydroxide and the heat-treated particles, thereby leaving excess lithium or unreacted particles, or insufficiently completing crystal structures, and adequate battery characteristics thus fail to be achieved in the case of use in a battery. Alternatively, there is a possibility that the calcination temperature in excess of 980° C. will cause intense sintering between particles of the lithium-nickel composite oxide, and cause abnormal particle growth, and for this reason, there is a possibility that calcined particles will be coarse, thereby resulting in an inability to maintain the particle shapes of secondary particles as described above. Such a positive electrode active material fails to achieve the advantageous effect of the secondary particle shape as described above.

It is to be noted that from the perspective of homogeneously developing the reaction of the nickel composite hydroxide and the heat-treated particles with the lithium compound, it is preferable to increase in temperature up to the calcination temperature at a rate of temperature increase from 3° C./min to 10° C./min. Furthermore, keeping a temperature around the melting point of the lithium compound for 1 hour to 5 hours can develop the reaction in a more homogeneous manner.

(Calcining Time)

The holding time at the calcination temperature in the calcining time is preferably at least 2 hours or more, more preferably 4 hours to 24 hours. The holding time of shorter than 2 hours may make the crystallinity of the lithium-nickel composite oxide insufficient. In the case of calcining a sagger filled with the lithium mixture after the holding time, which is not to be considered particularly limited, it is preferable to cool the atmosphere at a rate of temperature decrease from 2° C./min to 10° C./min until reaching 200° C. or lower in order to prevent the sagger from being deteriorated.

(Pre-Calcination)

In particular, when lithium hydroxide or lithium carbonate is used as the lithium compound, the mixture is preferably subjected to pre-calcination before the calcination by keeping the compound at a temperature that is lower than the calcination temperature and 350° C. to 800° C., preferably 450° C. to 780° C. for approximately 1 hour to 10 hours, preferably 3 hours to 6 hours. More specifically, the mixture is preferably subjected to pre-calcination at the temperature of the reaction between the lithium hydroxide or lithium carbonate and the nickel composite hydroxide and heat-treated particles. In this case, keeping the mixture around the reaction temperature of the lithium hydroxide or lithium carbonate sufficiently diffuses lithium into the nickel composite hydroxide and the heat-treated particles, thereby making it possible to provide a homogeneous lithium-nickel composite oxide.

(Calcination Atmosphere)

The atmosphere for the calcination is an oxidizing atmosphere, the oxygen concentration is preferably adjusted to 18 volume % to 100 volume %, and a mixed atmosphere of oxygen and an inert gas is more preferred. More specifically, the calcination is preferably carried out in the air atmosphere, or in an oxygen flow. When the oxygen concentration is lower than 18 volume %, there is a possibility that the crystallinity of the lithium-nickel composite oxide will be insufficient.

It is to be noted that the furnace for use in the calcination is not to be considered particularly limited, as long as the furnace can heat the lithium mixture in the air atmosphere or an oxygen flow, but from the perspective of keeping the atmosphere in the furnace homogeneous, an electric furnace without gas generation is preferred, and any batch or continuous furnace can be used.

(Grinding)

The lithium-nickel composite oxide obtained by the calcination may be aggregated, or lightly sintered. In this case, the oxide may be subjected to grinding, thereby making it possible to provide a lithium-nickel composite oxide, that is, a positive electrode active material according to the present embodiment.

It is to be noted that the grinding refers to the operation of inputting mechanical energy to aggregates composed of multiple secondary particles produced by sintering necking or the like between secondary particles during the calcination, thereby separating the secondary particles almost without destroying the secondary particles themselves, thus loosening the aggregates. This operation can provide a lithium-nickel composite oxide with a narrow particle size distribution, while the secondary particle structure is kept.

The process for producing the positive electrode active material as described above includes: the mixing step of mixing the nickel composite hydroxide with the lithium compound, thereby forming the lithium mixture; and the calcining step of calcining the lithium mixture formed in the mixing step at a temperature of 650° C. to 980° C. in an oxidizing atmosphere, thereby making it possible to provide a positive electrode active material which is characteristic as described above.

The process for producing the positive electrode active material has extremely high industrial value, due to the fact that the process is easily implemented with high productivity, and thus suitable for production on an industrial scale.

[3] Non-Aqueous Electrolyte Secondary Battery

The non-aqueous electrolyte secondary battery adopts a positive electrode that uses the positive electrode active material described above. First, the structure of the non-aqueous electrolyte secondary battery will be described.

The non-aqueous electrolyte secondary battery (hereinafter, referred to simply as a "secondary battery") according to the present embodiment has substantially the same structure as a common non-aqueous electrolyte secondary battery, except for the use of the positive electrode active material described above for a positive electrode material, and thus will be described briefly.

The secondary battery may have a known common configuration such as cylindrical, rectangular, coin, and button shape. For example, in the case of a cylindrical secondary battery, the secondary battery has a case, and a structure including a positive electrode, a negative electrode, a non-aqueous electrolyte, and a separator housed in the case. More specifically, the secondary battery is formed by stacking the positive electrode and the negative electrode with the separator interposed therebetween, thereby providing an electrode body, impregnating the obtained electrode body with the non-aqueous electrolyte, making connections between a positive electrode current collector of the positive electrode and a positive electrode terminal leading to the exterior, and between a negative electrode current collector of the negative electrode and a negative electrode terminal leading to the exterior, respectively with the use of leads for current collection or the like, and sealing the body in the case.

It is to be noted that the structure of the secondary battery to which the present invention can be applied is obviously not limited to the example mentioned above, and as for the outline of the battery, various shapes can be adopted such as a cylindrical and stacked shape.

(Positive Electrode)

The positive electrode is a sheet-like member, which can be formed in a way that a positive electrode mixture paste containing the positive electrode active material is applied to the surface of a current collector, for example, made of aluminum foil, and dried. In addition, the positive electrode mixture paste applied to the surface of a current collector and dried may be referred to as an "electrode film".

Further, the positive electrode is processed appropriately in accordance with a battery that uses the positive electrode. The positive electrode is subjected to, for example, cutting for forming into an appropriate size depending on the intended battery, or pressure compression through a roll press or the like in order to increase the electrode density.

The positive electrode mixture paste is formed by kneading with the addition of a solvent to a positive electrode mixture. The positive electrode mixture is formed by mixing the powdery positive electrode active material according to the present invention with a conductive material and a binder.

The conductive material is added for providing the electrode with appropriate conductivity. This conductive material is not particularly limited, but for example, carbon black materials can be used such as graphite (e.g., natural graphite, artificial graphite, and expanded graphite), acetylene black, and Ketjen black.

The binder serves to bind positive electrode active material particles together. The binder for use in the positive electrode mixture is not particularly limited, but for example, polyvinylidene fluoride (PVDF), polytetrafluoroethylene (PTFE), fluorine-containing rubbers, ethylene-propylene-diene rubbers, styrene butadiene, cellulose resins, and polyacrylic acid can be used.

Further, activated carbon or the like may be added to the positive electrode mixture, and the addition of activated carbon or the like can increase the electric double layer capacity of the positive electrode.

The solvent dissolves the binder, and diffuses the positive electrode active material, the conductive material, and the activated carbon or the like in the binder. This solvent is not particularly limited, but for example, organic solvents such as N-methyl-2-pyrrolidone can be used.

In addition, the mixture proportions of the respective substances are not particularly limited in the positive electrode mixture paste. For example, when the solid content of the positive electrode mixture excluding the solvent is regarded as 100 parts by mass, the mixture proportions may be the same as those in a positive electrode of a common non-aqueous electrolyte secondary battery, the content of the positive electrode active material can be 60 parts by mass to 95 parts by mass, the content of the conductive material can be 1 part by mass to 20 parts by mass, and the content of the binder can be 1 part by mass to 20 parts by mass.

(Negative Electrode)

The negative electrode is a sheet-like member formed by applying a negative electrode mixture paste to the surface of a current collector of metal foil such as copper, and dying the paste. While this negative electrode differs in the constituents of the negative electrode mixture paste, the combination of the constituents, the material of the current collector, and the like, the negative electrode is formed substantially in the same way as the positive electrode, and subjected to various types of processing, if necessary, as with the positive electrode.

The negative electrode mixture paste is obtained in a way that an appropriate solvent is added to a negative electrode mixture obtained by mixing a negative electrode active material and a binder, thereby making a paste.

The negative electrode active material can adopt, for example, a lithium-containing substance such as metal lithium and a lithium alloy, or an occlusion substance that can occlude and desorb lithium ions.

The occlusion substance is not particularly limited, but for example, calcined products of organic compounds such as natural graphite, artificial graphite, and phenolic resins, and powdery products of carbonaceous substances such as coke can be used. When the occlusion substance is adopted for the negative electrode active material, as with the positive electrode, a fluorine-containing resin such as PVDF can be used as a binder, and an organic solvent such as N-methyl-2-pyrrolidone can be used as a solvent for dispersion of the negative electrode active material in the binder.

(Separator)

The separator is disposed to be sandwiched between the positive electrode and the negative electrode, and has the functions of separating the positive electrode and the negative electrode and holding the electrolyte. This separator can use, for example, a thin film such as polyethylene and polypropylene, which has a large number of micropores. It is to be noted that the separator is not particularly limited as long as the separator has the separator functions.

(Non-Aqueous Electrolyte)

The non-aqueous electrolyte is a lithium salt as a supporting salt, dissolved in an organic solvent. As the organic solvent, one selected from cyclic carbonates such as ethylene carbonate, propylene carbonate, butylene carbonate, and trifluoropropylene carbonate; chain carbonates such as diethyl carbonate, dimethyl carbonate, ethyl methyl carbonate, and dipropyl carbonate; ether compounds such as tetrahydrofuran, 2-methyltetrahydrofuran, and dimethoxyethane; sulfur compounds such as ethyl methyl sulfone and butanesultone; and phosphorous compound such as triethyl phosphate and trioctyl phosphate can be used singly, or two or more thereof can be used in mixture.

$LiPF_6$, $LiBF_4$, $LiClO_4$, $LiAsF_6$, $LiN(CF_3SO_2)_2$, and composite salts thereof can be used as the supporting salt.

It is to be noted that the electrolytic solution may include a radical scavenger, a surfactant, a flame retardant, and the like for the improvement of battery characteristics.

(Battery Characteristics of Non-Aqueous Electrolyte Secondary Battery)

The secondary battery that has the configuration described above has the positive electrode that uses the positive electrode active material that has characteristic structure and properties as described above, thus has an increased area of contact between the positive electrode active material and the non-aqueous electrolyte, and an increased density of filling with the positive electrode active material, thereby achieving high output characteristics and battery capacity, and thus making it possible to achieve a high electrode density, in spite of the thin electrode film. Therefore, the secondary battery allows the formation of a thin electrode film, thereby achieving a high initial discharge capacity and a low positive electrode resistance, and thus resulting in a high output with a high capacity. In addition, the secondary battery has a high volume energy density. Furthermore, the thermal stability is high, and the safety is also excellent, as compared with conventional positive electrode active materials of lithium-nickel oxides.

(Applications of Secondary Battery)

The secondary battery is, because the battery has excellent battery characteristics, preferred for a power source of a small portable electronic device (e.g., lap-top personal computer, a cellular phone unit) which always requires a high capacity.

In addition, the secondary battery is also preferred for a battery as a power source for motor drive, which requires a high output. In general, the increase in battery size makes it difficult to ensure safety, thereby making an expensive protective circuit essential. However, the secondary battery has excellent safety performance, thereby not only making it easy to ensure safety, but also making it possible to simplify an expensive protective circuit, and thus further reduce the cost. Further, it is possible to reduce the size of the secondary battery, and increase the output thereof, and the secondary battery is thus preferred as a power source for a transportation device subjected to a restriction on mounting space.

EXAMPLES

The present invention will be described in more detail below with reference to examples and comparative examples, but the present invention is not to be considered limited by the examples in any way. Evaluations on the present examples were made in the following way. It is to be noted that unless otherwise noted, respective samples of special grade chemicals from Wako Pure Chemical Industries, Ltd. were used for the production of the lithium-nickel composite oxide and positive electrode active material and the production of the secondary battery.

(1) Volume Average Particle Size and Particle Size Distribution Measurement

Evaluations were made from the results of measurement with a laser diffraction type particle size analyzer (trade name: Microtrac from NIKKISO CO., LTD.).

(2) Appearance of Particle

Observations were made with a scanning electron microscope (SEM (Scanning Electron Microscope): trade name S-4700 from Hitachi High-Technologies Corporation). For the aspect ratio, twenty particles were selected in a random manner and subjected to the measurement in the SEM observation, and the average value was calculated. For the average value for the maximum diameters of plate-shaped primary particles, fifty particles were selected in a random manner and subjected to the measurement in the SEM observation, and the average value was calculated.

(3) Analysis of Metal Component

The sample was dissolved, and then confirmed by an ICP (Inductively Coupled Plasma) emission spectrometry.

(4) Preparation and Evaluation of Battery (Evaluation Battery)

Figure 4:
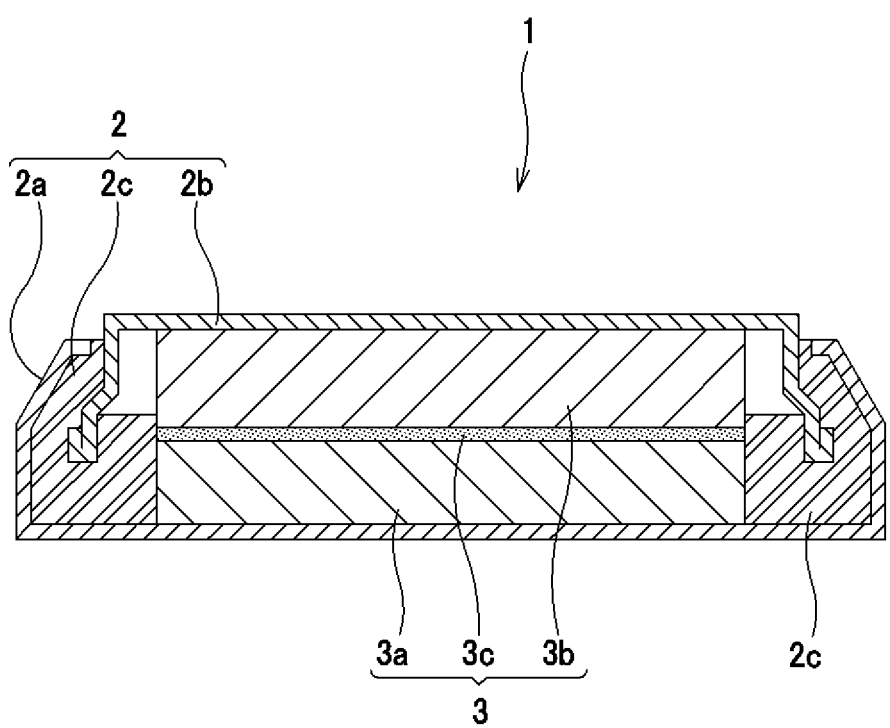
FIG. 4 is a schematic cross-sectional view of a coin-type battery for use in battery evaluation.

Used was the 2032 type coin battery (hereinafter, referred to as a "coin-type battery 1") shown in FIG. 4. As shown in FIG. 4, the coin-type battery 1 is composed of a case 2 and an electrode 3 housed in the case 2. The case 2 has a positive electrode can 2a that is hollow and opened at one end, and a negative electrode can 2b disposed at the opening of the positive electrode can 2a, and the case is configured such that a space that houses the electrode 3 is formed between the negative electrode can 2b and the positive electrode can 2a when the negative electrode can 2b is disposed at the opening of the positive electrode can 2a. The electrode 3 is composed of a positive electrode 3a, a separator 3c, and a negative electrode 3b, stacked to be arranged in this order, and housed in the case 2 such that the positive electrode 3a is brought into contact with the inner surface of the positive electrode can 2a, whereas the negative electrode 3b is brought into contact with the inner surface of the negative electrode can 2b. Further, the case 2 includes a gasket 2c, and the gasket 2c fixes relative movements such that the positive electrode can 2a and the negative electrode can 2b are kept without making contact with each other. In addition, the gasket 2c also has the function of hermetically sealing the gap between the positive electrode can 2a and the negative electrode can 2b, and thus isolating the inside of the case 2 from the outside in an airtight and liquid-tight manner.

(Preparation of Battery)

First, 52.5 mg of the positive electrode active material, 15 mg of acetylene black, and 7.5 mg of a polytetrafluoroethylene resin (PTFE) were mixed, and pressed into a shape of 11 mm in diameter and 100 μm in thickness at a pressure of 100 MPa, thereby preparing the positive electrode 3a. The prepared positive electrode 3a was dried for 12 hours at 120° C. in a vacuum drier. The positive electrode 3a, the negative electrode 3b, the separator 3c, and an electrolytic solution were used to prepare the above-mentioned coin-type battery 1 in a glove box in an Ar atmosphere with a dew point controlled at −80° C. Further, for the negative electrode 3b, a negative electrode sheet punched into a disc-like shape of 14 mm in diameter was used with a graphite powder on the order of 20 μm in average particle size and polyvinylidene fluoride applied to copper foil. In addition, a polyethylene porous film of 25 μm in film thickness was used for the separator 3c. For the electrolytic solution, a mixed solution of equal parts of ethylene carbonate (EC) and diethyl carbonate (DEC) with 1 M of $LiClO_4$ as a supporting electrolyte (from TOMIYAMA PURE CHEMICAL INDUSTRIES, Ltd.) was used.

(Initial Discharge Capacity)

When the coin-type battery 1 prepared was left for approximately 24 hours, charged to a cutoff voltage of 4.3 V with a current density adjusted to 0.1 mA/cm² for the positive electrode 3a after the open circuit voltage OCV (Open Circuit Voltage) was stabilized, and discharged to a cutoff voltage of 3.0 V after a pause for 1 hour, the capacity was regarded as an initial discharge capacity.

(Cycle Capacity Maintenance Rate)

With a current density adjusted to 2 mA/cm² for the positive electrode of the coin-type battery 1, the cycle of charging up to 4.2 V and discharging down to 3.0 V was repeated 200 times, and the ratio between the discharge capacity after the repetition of charge and discharge and the initial discharge capacity was calculated as a cycle capacity maintenance rate. A multichannel voltage/current generator (from ADVANTEST CORPORATION, R6741A) was used for the measurement of the charge-discharge capacity.

(Rate Characteristics)

Evaluations were made from the discharge capacity maintenance rate of the coin-type battery 1 in the case of the discharge rate increased from 0.2 C to 5 C.

Example 1

[Nucleation Step]

According to Example 1, cobalt (II) sulfate heptahydrate (Co molar concentration: 1.38 mol/L) and 900 mL of pure water were put in a crystallization reaction container of 5 L in volume equipped with four baffle plates, and warmed to 60° C. in a thermostatic tank and a warming jacket while stirring at a revolving speed of 1000 rpm with six inclined blade paddles, thereby providing an unreacted aqueous solution. A nitrogen gas was distributed in the reaction container, thereby providing a nitrogen atmosphere therein, and the oxygen concentration was 1.0% in the space in the reaction rank in this case. An aqueous solution of 6.25 mass % sodium hydroxide was supplied at 42 mL/min to increase the pH of the unreacted aqueous solution up to 13 on the basis of a liquid temperature of 25° C., and then stirred continuously for 30 minutes, thereby providing plate-shaped crystal nucleus-containing slurry.

[Particle Growth Step]

According to Example 1, an aqueous solution including a nickel sulfate (Ni molar concentration: 1.25 mol/L) and a manganese sulfate (Mn molar concentration: 0.75 mol/L) was prepared as the mixed aqueous solution. To the plate-shaped nucleus-containing slurry, 25 mass % ammonia water was added such that the ammonia concentration in the tank was 10 g/L, and an aqueous solution of 64 mass % sulfuric acid was further added thereto to adjust the pH to 11.6 on the basis of a liquid temperature of 25° C., thereby providing slurry for particle growth. As with the nucleation step, in a nitrogen atmosphere, the mixed aqueous solution was supplied at 12.9 ml/min to the slurry for particle growth, and in addition, an aqueous solution of 25 mass % sodium hydroxide was supplied thereto while supplying 25 mass % ammonia water as a complexing agent, thereby controlling the slurry such that the ammonia concentration was 10 g/L with constant pH of 11.6 on the basis of a liquid temperature of 25° C., and thus producing a nickel composite hydroxide. Thereafter, the hydroxide was washed with water, filtrated, and dried for 24 hours at 120° C. in the air atmosphere. The nickel composite hydroxide obtained was $Ni_{0.50}Co_{0.20}Mn_{0.30}(OH)_2$ in composition. In addition, the volume average particle size (Mv) was 10.6 and the [(D90−D10)/Mv] indicating a particle size variation index was 0.65.

Figure 5:
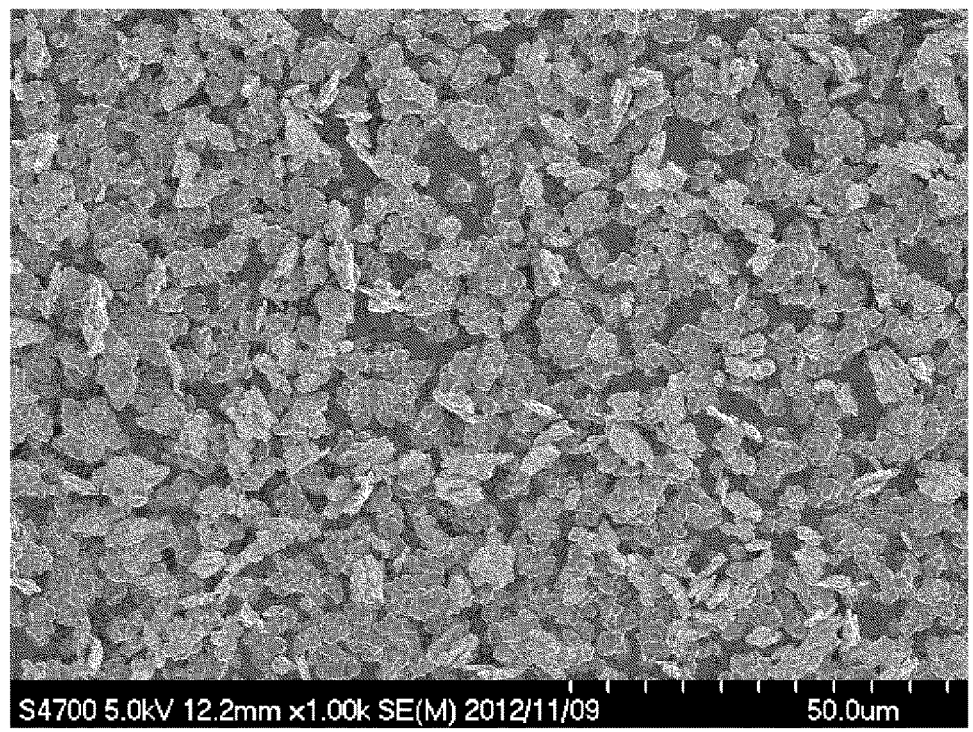
FIG. 5 is a scanning electron micrograph (1000-fold magnification for observation) of a nickel composite hydroxide obtained according to Example 1.

FIG. 5 shows a SEM observation result in Example 1. The aspect ratio measured from the SEM observation was 6.3, and the average value was 2.1 μm for the maximum diameters of shapes projected from directions perpendicular to plate surfaces of plate-shaped primary particles (the maximum diameters of plate-shaped primary particles projected from directions perpendicular to plate surfaces of secondary particles). The analysis of a cross section of the obtained nickel composite hydroxide (secondary particles) with an energy dispersive X-ray analyzer confirmed that a high concentration layer containing cobalt was formed in central parts of the secondary particles in the width directions thereof, and the high concentration layer was 0.4 μm in average thickness.

[Production and Evaluation of Positive Electrode Active Material]

According to Example 1, the obtained nickel composite hydroxide and lithium hydroxide weighed to meet Li/Me=1.02 were mixed to form a lithium mixture. The mixing was carried out with the use of a shaker-mixer (from Willy A. Bachofen AG (WAB), TURBULA Typet2C).

Next, according to Example 1, the obtained lithium mixture was subjected to calcination for 5 hours at 900° C. in an air flow, cooled, and then subjected to grinding, thereby providing a positive electrode active material. The obtained positive electrode active material was $Li_{1.02}Ni_{0.50}Co_{0.20}Mn_{0.30}O_2$ in composition, and the analysis with an X-ray diffractometer (from PANalytical, X'Pert PRO) confirmed a single phase of a hexagonal lithium composite oxide. In addition, the orientation index at the (003) plane was 0.97, which was obtained from the X-ray diffraction waveform, and the site occupancy obtained from Rietveld analysis was 4.0% at 3a sites with metal ions other than lithium, whereas the site occupancy obtained therefrom was 5.0% at 3b sites with lithium ions. The specific surface area measured by a BET (Brunauer, Emmett, Teller) method was 1.3 m²/g. Furthermore, a 2032-type coin battery (coin-type battery 1) was prepared, and evaluated for initial discharge capacity, cycle capacity maintenance rate, and rate characteristics.

Further, according to Example 1, Table 1 shows the evaluation results, besides the volume average particle size (Mv), aspect ratio, composition ratio evaluated in the same way as the nickel composite hydroxide. The [(D90−D10)/Mv] was equivalent to that of the nickel composite hydroxide.

Example 2

According to Example 2, a nickel composite hydroxide was obtained in the same way as in Example 1, except that the pH in the nucleation step was adjusted to 13.7 on the basis of a liquid temperature of 25° C. The secondary particles of the nickel composite hydroxide obtained were 9.6 μm in volume average particle size (Mv), and 10.7 in aspect ratio.

According to Example 2, a positive electrode active material was obtained and evaluated in the same way as in Example 1, except for the use of the nickel composite hydroxide obtained. The evaluation results are shown in Tables 1 and 2.

Example 3

According to Example 3, a nickel composite hydroxide was obtained in the same way as in Example 1, except that the pH in the nucleation step was adjusted to 12.7 on the basis of a liquid temperature of 25° C. The secondary particles of the nickel composite hydroxide obtained were 11.8 μm in volume average particle size (Mv), and 5.5 in aspect ratio.

According to Example 3, a positive electrode active material was obtained and evaluated in the same way as in Example 1, except for the use of the nickel composite hydroxide obtained. The evaluation results are shown in Tables 1 and 2.

Example 4

According to Example 4, a nickel composite hydroxide was obtained in the same way as in Example 1, except that the pH in the particle growth step was adjusted to 12.3 on the basis of a liquid temperature of 25° C. The secondary particles of the nickel composite hydroxide obtained were 9.9 μm in volume average particle size (Mv), and 4.6 in aspect ratio.

According to Example 4, a positive electrode active material was obtained and evaluated in the same way as in Example 1, except for the use of the nickel composite hydroxide obtained. The evaluation results are shown in Tables 1 and 2.

Example 5

According to Example 5, a nickel composite hydroxide was obtained in the same way as in Example 1, except that the pH in the particle growth step was adjusted to 10.7 on the basis of a liquid temperature of 25° C. The secondary particles of the nickel composite hydroxide obtained were 11.4 μm in volume average particle size (Mv), and 4.9 in aspect ratio.

According to Example 5, a positive electrode active material was obtained and evaluated in the same way as in Example 1, except for the use of the nickel composite hydroxide obtained. The evaluation results are shown in Tables 1 and 2.

Example 6

According to Example 6, a nickel composite hydroxide was obtained in the same way as in Example 1, except that the oxygen concentration in the space in the reaction tank was adjusted to 3.0 volume %. The secondary particles of the nickel composite hydroxide obtained were 10.1 μm in volume average particle size (Mv), and 4.2 in aspect ratio.

According to Example 6, a positive electrode active material was obtained and evaluated in the same way as in Example 1, except for the use of the nickel composite hydroxide obtained. The evaluation results are shown in Tables 1 and 2.

Comparative Example 1

[Nucleation Step] According to Comparative Example 1, 900 ml of pure water and 40 ml of 25 mass % ammonia water were put in a crystallization reaction container of 5 L in volume equipped with four baffle plates, and warmed to 60° C. in a thermostatic tank and a warming jacket while stirring at a revolving speed of 1000 rpm with six inclined blade paddles, and an aqueous solution of 25 mass % sodium hydroxide was then added to adjust the pH of the solution in the reaction container to 12.6 on the basis of a liquid temperature of 25° C., thereby providing an unreacted aqueous solution.

On the other hand, according to Comparative Example 1, an aqueous solution including a nickel sulfate (Ni molar concentration: 1.00 mol/L), a cobalt sulfate (Co molar concentration: 0.40 mol/L), and a manganese sulfate (Mn molar concentration: 0.60 mol/L) was prepared as a raw material aqueous solution for nucleation.

According to Comparative Example 1, while stirring the unreacted aqueous solution kept at 60° C., a specified amount of the raw material aqueous solution for nucleation was supplied at 12.9 ml/min to the unreacted aqueous solution, and in addition, 25% ammonia water as a complexing agent at 1.5 ml/min, and an aqueous solution of 25 mass % sodium hydroxide as a neutralizer were supplied thereto, thereby controlling the solution such that the ammonia concentration was 10 g/L with constant pH of 12.6 on the basis of a liquid temperature 25° C., and thus providing crystal nucleus-containing slurry.

[Particle Growth Step]

According to Comparative Example 1, an aqueous solution of 64 mass % sulfuric acid was added to the crystal nucleus-containing slurry to adjust the pH to 11.6 on the basis of a liquid temperature 25° C., thereby providing slurry for particle growth. The mixed aqueous solution prepared in the same way as the raw material aqueous solution for nucleation was supplied at 12.9 ml/min to the slurry for particle growth, and in addition, an aqueous solution of 25 mass % sodium hydroxide was supplied thereto while supplying 25 mass % ammonia water as a complexing agent, thereby controlling the slurry such that the ammonia concentration was 10 g/L with constant pH of 11.6, and thus producing a nickel composite hydroxide. Thereafter, the hydroxide was washed with water, filtrated, and dried for 24 hours at 120° C. in the air atmosphere. The obtained nickel composite hydroxide was evaluated in the same way. The nickel composite hydroxide was $Ni_{0.50}Co_{0.20}Mn_{0.30}(OH)_2$ in composition. In addition, the volume average particle size (Mv) was 9.2 and the [(D90−D10)/Mv] indicating a particle size variation index was 0.48.

Figure 6:
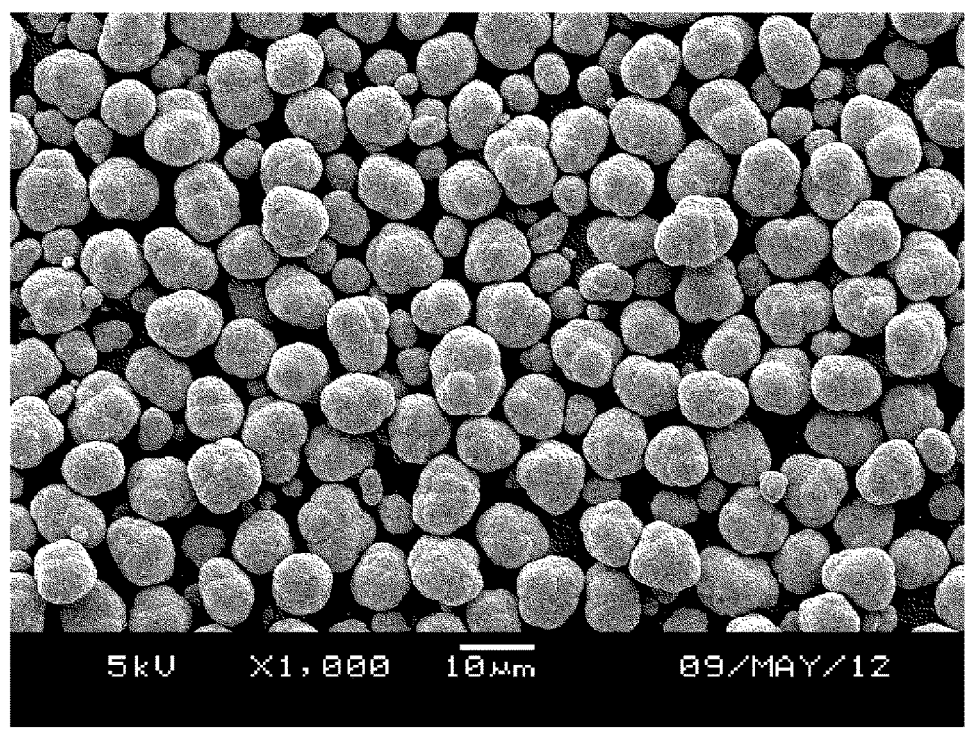
FIG. 6 is a scanning electron micrograph (1000-fold magnification for observation) of a nickel composite hydroxide obtained according to Comparative Example 1.

FIG. 6 shows a SEM observation result in Comparative Example 1. The aspect ratio measured from the SEM observation was 1.1, and it has been thus confirmed that the nickel composite hydroxide has substantially spherical hydroxide particles.

[Production and Evaluation of Positive Electrode Active Material]

According to Comparative Example 1, a positive electrode active material was obtained and evaluated in the same way as in Example 1, except for the use of the nickel composite hydroxide obtained. The evaluation results are shown in Tables 1 and 2. The obtained positive electrode active material was $Li_{1.02}Ni_{0.50}Co_{0.20}Mn_{0.30}O_2$ in composition, and the analysis with an X-ray diffractometer (from PANalytical, X'Pert PRO) confirmed a single phase of a hexagonal lithium composite oxide.

Comparative Example 2

According to Comparative Example 2, a nickel composite hydroxide was obtained in the same way as in Example 1, except that the pH in the nucleation step was adjusted to 12.0 on the basis of a liquid temperature of 25° C. The secondary particles of the nickel composite hydroxide obtained were 11.8 µm in volume average particle size (Mv), and 2.5 in aspect ratio, and the average value was 1.6 µm for the maximum diameters projected from directions perpendicular to plate surfaces of plate-shaped primary particles.

According to Comparative Example 2, a positive electrode active material was obtained and evaluated in the same way as in Example 1, except for the use of the nickel composite hydroxide obtained. The evaluation results are shown in Tables 1 and 2.

Comparative Example 3

According to Comparative Example 3, a nickel composite hydroxide was obtained in the same way as in Example 1, except that the pH in the particle growth step was adjusted to 12.7 on the basis of a liquid temperature of 25° C. The secondary particles of the nickel composite hydroxide obtained were 7.2 µm in volume average particle size (Mv), and 2.0 in aspect ratio.

According to Comparative Example 3, a positive electrode active material was obtained and evaluated in the same way as in Example 1, except for the use of the nickel composite hydroxide obtained. The evaluation results are shown in Tables 1 and 2.

Comparative Example 4

According to Comparative Example 4, a nickel composite hydroxide was obtained in the same way as in Example 1, except that the space in the reaction tank was changed to the air atmosphere. The secondary particles of the nickel composite hydroxide obtained were 4.1 µm in volume average particle size (Mv), and 1.3 in aspect ratio.

According to Comparative Example 4, a positive electrode active material was obtained and evaluated in the same way as in Example 1, except for the use of the nickel composite hydroxide obtained. The evaluation results are shown in Tables 1 and 2.

TABLE 1

|  | Volume average particle size (µm) | Aspect ratio | Orientation index at a (003) plane |
|---|---|---|---|
| Example 1 | 10.6 | 6.3 | 0.97 |
| Example 2 | 9.6 | 10.7 | 0.94 |
| Example 3 | 11.8 | 5.5 | 0.99 |
| Example 4 | 9.9 | 4.6 | 0.95 |
| Example 5 | 11.4 | 4.9 | 0.98 |
| Example 6 | 10.1 | 4.2 | 0.99 |
| Comparative Example 1 | 9.2 | 1.1 | 1.04 |
| Comparative Example 2 | 11.8 | 2.5 | 1.01 |
| Comparative Example 3 | 7.2 | 2.0 | 1.03 |
| Comparative Example 4 | 4.1 | 1.3 | 1.15 |

TABLE 2

|  | Initial discharge capacity (mAh/g) | Discharge capacity for 5 C/discharge capacity for 0.2 C (%) | Capacity maintenance rate after 200 cycle (%) |
|---|---|---|---|
| Example 1 | 168 | 68.5 | 92 |
| Example 2 | 164 | 68.9 | 90 |
| Example 3 | 168 | 67.6 | 92 |
| Example 4 | 165 | 64.2 | 90 |
| Example 5 | 168 | 65.1 | 91 |
| Example 6 | 165 | 64.2 | 91 |
| Comparative Example 1 | 167 | 60.2 | 90 |
| Comparative Example 2 | 165 | 60.8 | 89 |
| Comparative Example 3 | 166 | 61.7 | 90 |
| Comparative Example 4 | 163 | 56.8 | 90 |

According to Examples 1 to 6, the nickel composite hydroxides were obtained which were 3 to 20 in aspect ratio and 4 µm to 20 µm in volume average particle size (Mv), and the plate-shaped lithium composite oxides obtained with the use of the nickel composite hydroxides as precursors were also equivalent to the nickel composite hydroxides in the values of the aspect ratio and volume average particle size. It has been confirmed that the coin batteries using the lithium composite oxides as positive electrode active materials are superior in battery characteristics (initial discharge capacity, cycle capacity maintenance rate, rate characteristics).

On the other hand, the lithium composite oxides which failed to meet the aspect ratio of 3 to 20 were obtained according to Comparative Examples 1 to 4. In addition, it has been determined that the coin batteries using the composite oxides as positive electrode active materials are inferior in battery characteristics.

Glossary of Drawing References

1 ... coin-type battery, 2 ... case, 2a ... positive electrode can, 2b ... negative electrode can, 2c ... gasket, 3 ... electrode, 3a ... positive electrode, 3b ... negative electrode, 3c ... separator

The invention claimed is:

1. A nickel composite hydroxide represented by $Ni_{1-x-y-z}Co_xMn_yM_z(OH)_{2+A}$ (x, y, z, and A in the formula fall within ranges of: $0<x\leq0.35$; $0\leq y\leq0.35$; $0\leq z\leq0.1$; and $0\leq A\leq0.5$, x, y, and z meet $0<x+y+z\leq0.7$, and M in the formula represents at least one additive element selected from V, Mg, Al, Ti, Mo, Nb, Zr, and W), the nickel composite hydroxide comprising plate-shaped secondary particles aggregated with overlaps between plate surfaces of multiple plate-shaped primary particles, the secondary particles having an aspect ratio of 3 to 20, wherein shapes projected from directions perpendicular to the plate surfaces of the plate-shaped primary particles are any of circular, elliptical, oblong, and planar shape, and a volume average particle size (Mv) of 4 µm to 20 µm measured by a laser diffraction scattering method.

2. The nickel composite hydroxide according to claim 1, wherein [(D90−D10)/Mv] indicating a particle size variation index is 0.70 or less, the variation index calculated from D90 and D10 in a particle size distribution obtained by a laser diffraction scattering method and the volume average particle size (Mv).

3. The nickel composite hydroxide according to claim 1, wherein an average value is 1 µm to 5 µm for maximum diameters of the plate-shaped primary particles projected from directions perpendicular to plate surfaces of the secondary particles.

4. The nickel composite hydroxide according to claim 1, wherein the plate-shaped primary particles comprise therein at least a concentration layer of cobalt.

5. The nickel composite hydroxide according to claim 4, wherein the concentration layer is 0.01 μm to 1 μm in thickness.

6. A production process for producing a nickel composite hydroxide represented by $Ni_{1-x-y-z}Co_xMn_yM_z(OH)_{2+A}$ (x, y, z, and A in the formula fall within ranges of: $0<x\leq0.35$; $0\leq y<0.35$; $0\leq z\leq0.1$; and $0\leq A\leq0.5$, x, y, and z meet $0<x+y+z\leq0.7$, and M in the formula represents at least one additive element selected from V, Mg, Al, Ti, Mo, Nb, Zr, and W), the process comprising:
   a nucleation step of generating plate-shaped crystal nuclei by adjusting an aqueous solution for nucleation, comprising a metal compound containing cobalt, wherein a content of cobalt is 90 atom % or more with respect to all metal elements, to an pH value of 12.5 or more on the basis of a liquid temperature of 25° C. in a non-oxidizing atmosphere with an oxygen concentration of 5 volume % or less; and
   a particle growth step of causing growth of the plate-shaped crystal nuclei until an aspect ratio falls within a range of 3 to 20, by adjusting slurry for particle growth, containing the plate-shaped crystal nuclei formed in the nucleation step, in a non-oxidizing atmosphere with an oxygen concentration of 5 volume % or less, such that a pH value of the slurry is 10.5 to 12.5 on the basis of a liquid temperature of 25° C., and lower than the pH value in the nucleation step, and supplying a mixed aqueous solution comprising a metal compound containing at least nickel to the slurry for particle growth.

7. The process for producing a nickel composite hydroxide according to claim 6, wherein nucleation is developed in a non-oxidizing atmosphere with an oxygen concentration of 2 volume % or less in the nucleation step.

8. The process for producing a nickel composite hydroxide according to claim 6, wherein the slurry for particle growth has an ammonia concentration adjusted to 5 g/L to 20 g/L in the particle growth step.

9. The process for producing a nickel composite hydroxide according to claim 6, wherein plate-shaped crystal nucleus-containing slurry with a pH value adjusted is used as the slurry for particle growth, the plate-shaped crystal nucleus-containing slurry containing the plate-shaped crystal nuclei obtained in the nucleation step.

10. A process for producing a positive electrode active material for a non-aqueous electrolyte secondary battery, the positive electrode active material comprising a lithium-nickel composite oxide represented by $Li_{1+u}Ni_{1-x-y-z}Co_xM_yM_zO_2$ (u, x, y, and z in the formula fall within ranges of: $-0.05\leq u\leq0.50$; $0<x\leq0.35$; $0\leq y<0.35$; and $0\leq z\leq0.1$, x, y, and z meet $0<x+y+z\leq0.7$, and M in the formula represents at least one additive element selected from V, Mg, Al, Ti, Mo, Nb, Zr, and W), the lithium-nickel composite oxide having a hexagonal layered structure, the process comprising:
   a mixing step of forming a lithium mixture by mixing the nickel composite hydroxide according to claim 1 with a lithium compound; and
   a calcining step of calcining the lithium mixture formed in the mixing step at a temperature of 650° C. to 980° C. in an oxidizing atmosphere.

11. The process for producing a positive electrode active material for a non-aqueous electrolyte secondary battery according to claim 10, wherein a ratio (Li/Me) of the lithium atom number (Li) to a sum (Me) of the atom numbers of metals other than lithium included in the lithium mixture is 0.95 to 1.5.

12. The process for producing a positive electrode active material for a non-aqueous electrolyte secondary battery according to claim 10, the process further comprising, before the mixing step, a heat treatment step of applying a heat treatment to the nickel composite hydroxide at a temperature of 300° C. to 750° C. in a non-reducing atmosphere.

13. The process for producing a positive electrode active material for a non-aqueous electrolyte secondary battery according to claim 10, wherein the oxidizing atmosphere in the calcining step is an atmosphere containing 18 volume % to 100 volume % of oxygen.

* * * * *